United States Patent
Semsak et al.

(10) Patent No.: US 10,799,770 B1
(45) Date of Patent: Oct. 13, 2020

(54) RFID GOLF BALL TESTING APPARATUS AND SYSTEMS

(71) Applicant: Topgolf International, Inc., Dallas, TX (US)

(72) Inventors: Mark Joseph Semsak, Des Plaines, IL (US); Romeo Espana, Carrollton, TX (US); Brian David Burdette, McKinney, TX (US); Clinton Scott Lovejoy, Dallas, TX (US); Adrian Torrance Chaney, Denver, CO (US); Hieu Nguyen-Minh Duong, Garland, TX (US); Robert Benton Ahlfinger, Addison, TX (US)

(73) Assignee: Topgolf International, Inc., Dallas, TX (US)

( * ) Notice: Subject to any disclaimer, the term of this patent is extended or adjusted under 35 U.S.C. 154(b) by 61 days.

(21) Appl. No.: 16/383,397

(22) Filed: Apr. 12, 2019

(51) Int. Cl.
*A63B 47/00* (2006.01)
*A63B 43/00* (2006.01)
*A63B 37/00* (2006.01)
*G06K 7/10* (2006.01)
(Continued)

(52) U.S. Cl.
CPC .......... *A63B 47/008* (2013.01); *A63B 37/007* (2013.01); *A63B 43/004* (2013.01); *A63B 69/3694* (2013.01); *G06K 7/10475* (2013.01); *A63B 47/04* (2013.01); *A63B 2047/043* (2013.01); *A63B 2225/54* (2013.01)

(58) Field of Classification Search
CPC .............................. A63B 47/008; A63B 47/002
See application file for complete search history.

(56) References Cited

U.S. PATENT DOCUMENTS

| 3,248,008 | A | * | 4/1966 | Meierjohan | ............ | A63B 69/40 |
| | | | | | | 221/205 |
| 5,833,091 | A | | 11/1998 | Palmer | | |
| 6,287,212 | B1 | | 9/2001 | Wetherell et al. | | |

(Continued)

OTHER PUBLICATIONS

ISPC.91A.09.0092E, Taoglas Antenna Solutions, 5dBi ISM Band 915MHz Embedded Ceramic Patch Antenna with Cable and Connector, Feb. 25, 2019, 17 pages, published online at https://www.taoglas.com/wp-content/uploads/2015/04/ISPC.91A.09.0092E.pdf.

(Continued)

*Primary Examiner* — James S. McClellan
*Assistant Examiner* — Peter J Iannuzzi
(74) *Attorney, Agent, or Firm* — Fish & Richardson P.C.

(57) ABSTRACT

Systems and apparatus for Radio Frequency Identification (RFID) golf ball testing include, in at least one aspect, an apparatus including: one or more RFID readers having associated read zones; a star wheel unit defining cavities to receive golf balls; golf ball sensors including at least one sensor for each respective path through the read zones; kickers including at least one kicker positioned after each respective path through the read zones and arranged to change a golf ball's direction of travel when the at least one kicker is activated; and a controller coupled with the kickers, the golf ball sensors, and the one or more RFID readers, wherein the controller is configured to activate any of the kickers responsive to the one or more RFID readers inadequately reading an RFID tag in a golf ball detected by the at least one sensor for that kicker's associated path through a read zone.

21 Claims, 15 Drawing Sheets

(51) Int. Cl.
    *A63B 47/04*         (2006.01)
    *A63B 69/36*         (2006.01)

(56) References Cited

U.S. PATENT DOCUMENTS

| | | | |
|---|---|---|---|
| 6,368,229 B1 * | 4/2002 | Wetherell | A63B 47/002 473/134 |
| 6,607,123 B1 | 8/2003 | Jollifee et al. | |
| 7,056,221 B2 | 6/2006 | Thirkettle | |
| 7,059,974 B1 | 6/2006 | Golliffe et al. | |
| 7,337,965 B2 | 3/2008 | Thirkettle et al. | |
| 8,866,613 B2 | 10/2014 | Luciano, Jr. | |
| 9,132,326 B2 | 9/2015 | Caster et al. | |
| 9,339,697 B2 | 5/2016 | Luciano et al. | |
| 10,463,923 B1 * | 11/2019 | Luciano, Jr. | A63B 47/04 |

OTHER PUBLICATIONS

Golf Ball Elevators—Range Servant, https://rangeservant.com/golf-driving-range-equipment/golf-ball-elevators/ Jan. 15, 2019, 5 pages.
Golf Ball Elevator—Range Servant America, https://rangeservant.us/product/golf-ball-elevator/ Jan. 15, 2019, 4 pages.

* cited by examiner

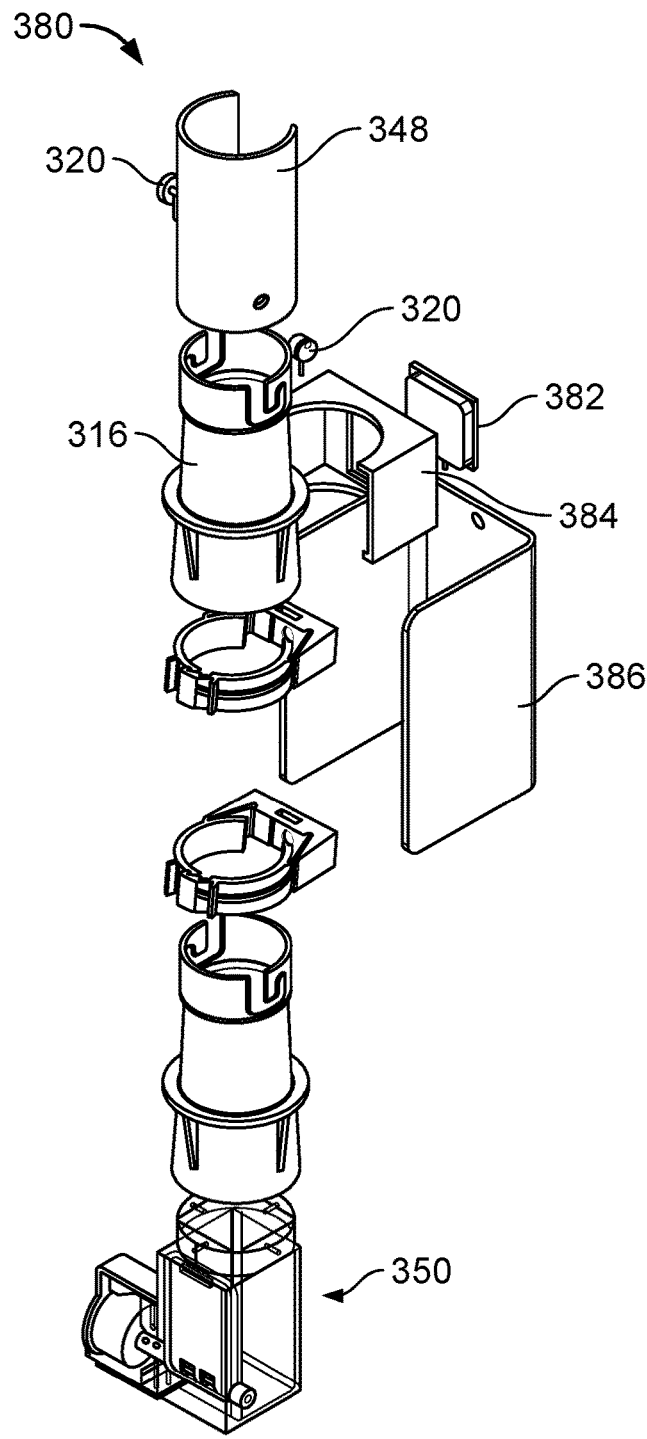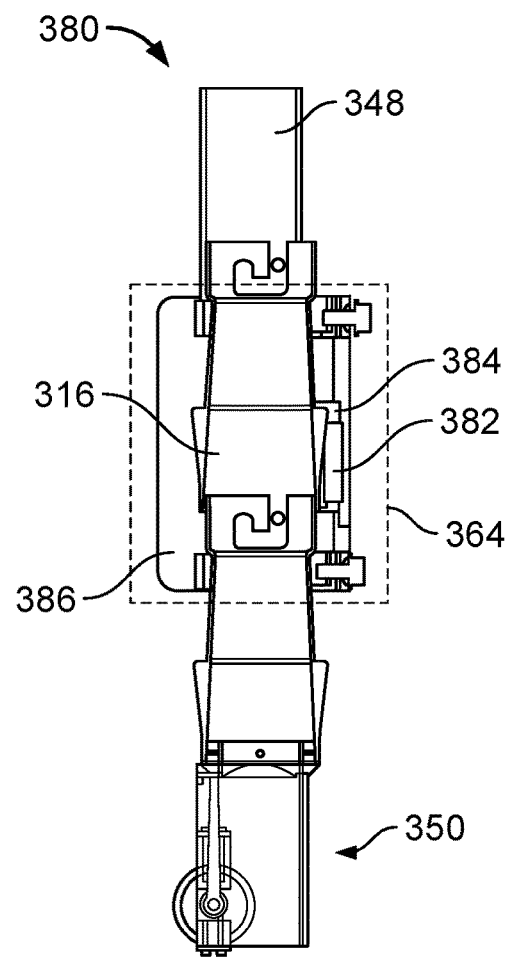
FIG. 3I
FIG. 3J

US 10,799,770 B1

RFID GOLF BALL TESTING APPARATUS AND SYSTEMS

BACKGROUND

This specification relates to the use of golf balls having Radio Frequency Identification (RFID) tags, and in particular, to testing such RFID equipped golf balls and the operability of the embedded RFID tag.

The game of golf has a long history, and in addition to traditional golf played on golf courses, driving ranges have been used by players to improve their game. Further, golf facilities have been developed in which golf balls with RFID tags are hit into targets that include RFID readers, allowing the creation of interactive golf games, where the successful hitting of a target with a golf ball is automatically identified in a computer system and reported back to the golfer to create a more exciting golf experience. This has encouraged new players to learn golf, resulting in a substantial increase in the interest in golf generally. Moreover, such golf facilities have experienced wide and growing popularity, which results in many millions of golf balls with RFID tags being hit each year.

As will be appreciated, the more each RFID equipped golf ball is used, the greater the chances that its RFID tag will stop functioning properly. Thus, RFID equipped golf balls have been tested previously using an apparatus that includes a feeder hopper and a specifically timed agitator screw assembly to alternately direct golf balls from the hopper onto two side-by-side sets of inclined rails set at a 4.5 to 5 degree pitch. Under the force of gravity, the golf balls roll down the two sets of rails (a golf ball rolling on a first set of two rails, followed by a golf ball rolling on a second set of two rails) such that the golf balls alternately roll past an optical input gate sensor, through a single RFID read zone with perpendicular antennas, and then past a single kicker placed between the two sets of rails. The kicker swings left or right to knock identified bad balls off one side or the other of the two sets of rails into a collection bin, where the timing and duration of the kick is determined by a program (running in a processor of the RFID reader) initiated by the input sensor, resulting in testing of approximately sixty-eight balls per minute.

SUMMARY

This specification describes technologies relating to RFID golf ball testing apparatus and systems. In general, one or more aspects of the subject matter described in this specification can be embodied in one or more apparatus that include: apparatus for testing golf balls including Radio Frequency Identification (RFID) tags, the apparatus including: one or more RFID readers having associated read zones for the golf balls; a star wheel unit defining cavities to receive the golf balls, the star wheel unit being positioned to drop the golf balls into respective paths through the read zones with alternating timing to reduce cross-talk, interference or both; golf ball sensors including at least one sensor for each respective path through the read zones; kickers including at least one kicker positioned after each respective path through the read zones and arranged to change a golf ball's direction of travel when the at least one kicker is activated; and a controller coupled with the kickers, the golf ball sensors, and the one or more RFID readers, wherein the controller is configured to activate any of the kickers responsive to the one or more RFID readers inadequately reading an RFID tag in a golf ball detected by the at least one sensor for that kicker's associated path through a read zone.

The one or more RFID readers can include a single reader multiplexed among all the read zones for the golf balls, a separate RFID reader for each of the read zones for the golf balls, or two or more separate RFID readers for two or more separate sets of golf ball testing lanes including the read zones for the golf balls. The star wheel unit, the golf ball sensors, the read zones, and the kickers can form a first set of golf ball testing lanes, and the apparatus can include a second set of golf ball testing lanes including: a second star wheel unit defining second cavities to receive the golf balls, the second star wheel unit being positioned to drop the golf balls into respective paths through second read zones associated with the one or more RFID readers; second golf ball sensors including at least one sensor for each respective path through the second read zones; and second kickers including at least one kicker positioned after each respective path through the second read zones and arranged to change a golf ball's direction of travel when the at least one kicker is activated; and wherein the controller is coupled with the second kickers, the second golf ball sensors, and the one or more RFID readers, and the controller is configured to activate any of the second kickers responsive to the one or more RFID readers inadequately reading an RFID tag in a golf ball detected by the at least one sensor for that kicker's associated path through a read zone.

Each star wheel unit can define five cavities to receive the golf balls in respective ones of at least three golf ball testing lanes. The five cavities in each adjacent golf ball testing lane of a given star wheel unit can be offset from each other such that the golf balls do not pass through adjacent read zones at a same time. Each path through a read zone can be formed by a housing that defines a helical track arranged to cause each of the golf balls to assume different orientations with respect to an antenna of the one or more RFID readers as each of the golf balls spirals down the helical track in response to gravitational force. Moreover, the antenna for each path through a read zone can be a single near-fielded antenna with a right-hand circular polarization, the antenna being arranged with respect to the helical track to read a golf ball as it moves along the helical track, and the antenna being coupled with a housing made of an RF reflecting material with a ground side of the antenna facing the RF reflecting material.

Each of the golf ball testing lanes can include an additional kicker, and the controller can be configured to activate any of the additional kickers responsive to the one or more RFID readers successfully reading an RFID tag in a golf ball detected by the at least one sensor for that additional kicker's associated path through a read zone when a program indicates the successfully read RFID tag is for a golf ball to be pulled from service. The program can indicate the golf ball to be pulled from service has been hit more than a threshold number of times and should be refurbished or refinished.

The apparatus can include: feed tubes for the first and second sets of golf ball testing lanes; a test lane adaptor including a feed tray and a ball lane router; and a ball supply device configured to drop the golf balls onto the feed tray; wherein the feed tray is arranged to receive the golf balls and deliver the golf balls to the ball lane router in response to gravitational force acting on the golf balls; and wherein the ball lane router is arranged to deliver the golf balls to respective ones of the feed tubes in response to gravitational force acting on the golf balls. Each of the feed tubes can include a flexible end portion. The apparatus can include a golf ball sensor positioned where the feed tray meets the ball lane router, wherein the golf ball sensor triggers stops and starts of the ball supply device to prevent jamming. In addition, the ball supply device can include a ball conveyor including shelves arranged to hold multiple golf balls in a line on each of the shelves, and the apparatus can include a wall portion for the ball conveyor, the wall portion including a panel that stops the multiple golf balls on a shelf as the multiple golf balls pass over a top of the ball conveyor, and the wall portion defining an opening that allows only a single line of golf balls on a single shelf to be dropped onto the feed tray at a time.

The feed tray can include a ball lane sorter having side walls that define lanes arranged to receive the golf balls, the side walls of the ball lane sorter include two exterior walls that are taller than the golf balls, and two or more interior walls that are shorter than the golf balls. The ball lane sorter can include perforations that allow water and any remaining debris from ball washing to pass through the perforations while also allowing the golf balls to roll freely in response to gravitational force acting on the golf balls. Each of the kickers can include a solenoid connected to a spring-loaded door that changes orientation to prevent a golf ball from passing through the kicker when the kicker is activated. Further, the apparatus can be constructed from modular pieces that allow variations in a number of golf ball testing lanes.

One or more aspects of the subject matter described in this specification can also be embodied in one or more systems that include: a golf range including targets for golf balls and one or more ball collection structures, wherein each of the golf balls includes a Radio Frequency Identification (RFID) tag, and each of the targets has at least one associated RFID reader; and a golf ball testing apparatus arranged to receive the golf balls, the golf ball testing apparatus including any of the feature recited above in paragraphs 4-9.

Various embodiments of the subject matter described in this specification can be implemented to realize one or more of the following advantages. RFID tags embedded in golf balls can be scanned for testing more efficiently, accurately and quickly. Constant forces, including those resulting from gravity and rotation, can be utilized to feed golf balls into the testing mechanism such that variability in the golf ball testing process, which impacts speed and scan quality, is reduced. The gravity driven system results in lower mechanical forces being required, which can increase the longevity of the apparatus and minimize maintenance requirements. The reduction in mechanical forces used can also reduce the potential for operator injury during system operations. The structures described can provide reduced sensitivity of set up for a golf ball testing system, and modular design facilitates swapping out of parts in case of failure or upgraded and/or expanded design.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 3H-3J show examples of antennas usable in the RFID testing apparatus of FIG. 3A.

Like reference numbers and designations in the various drawings indicate like elements.

DETAILED DESCRIPTION

Figure 1A:
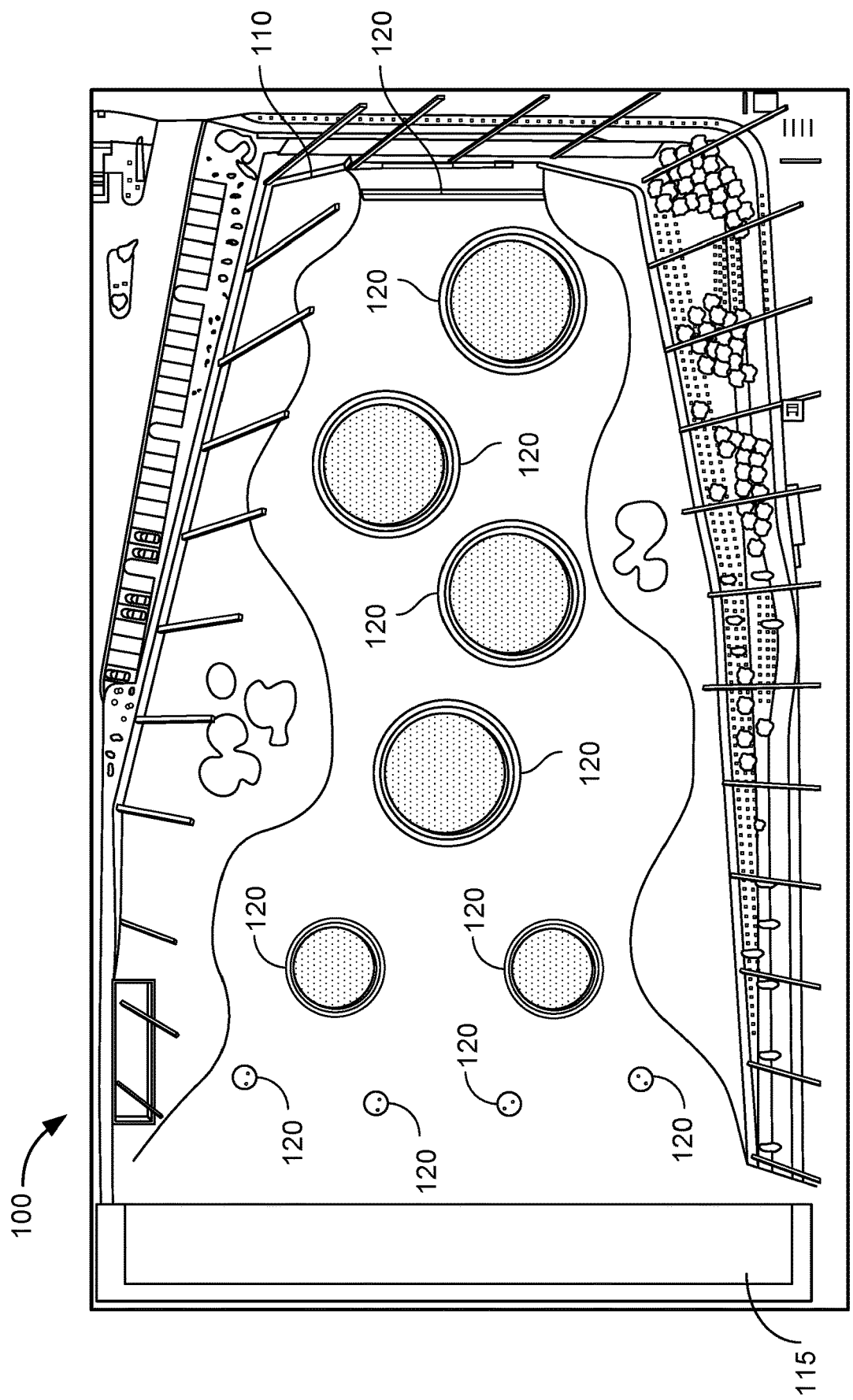
FIG. 1A shows an example of a golf facility including targets for RFID equipped golf balls.

FIG. 1A shows an example of a golf facility 100 including targets 120 for RFID equipped golf balls. The golf facility 100 includes a golf range 110 and a building 115. The golf range 110 can be of various shapes and sizes, but will typically be 300-500 feet wide and 600-900 feet long. The golf range 110 can be flat or include small hills or one or more inclines, and can also include hazards, such as water and sand traps. Note that such hazards need not include actual water and sand, but can simply be colored to look like water or sand. Moreover, the golf range 110 can be composed of real grass or artificial turf.

Included in the golf range 110 are targets 120 having different sizes and being different distances from the building 115, where people stand to hit golf balls toward the targets. The targets can be grouped into distance categories that generally represent their distance from the building 115, and the targets can have various shapes, such as the circular shapes of the main targets and the rectangular shape of the trench target at the end of the range 110. Other shapes for the targets 120, as well as different numbers of targets 120 than shown, are also possible.

Each of the targets 120 includes a mechanism for identifying and collecting the golf balls that enter the target. For example, each target can include netting that funnels the golf balls into an RFID reader box, where RFID tags inside the balls are read as each ball passes through the box. Each reader box can be equipped with an RFID antenna that is connected with an RFID reader, which in turn is connected with a computer system for the golf facility 100 that manages the golf games. Moreover, one or more of the targets 120 can include discrete sections of nets such that information regarding which portion of the target a particular golf ball lands in can be determined, and different points or game features can be applied accordingly. Each such net section can have its own reader box and RFID antenna, and multiple such antennas can be multiplexed into a single RFID reader to reduce the total number of RFID readers needed for the golf facility 100.

Once the golf balls are read and collected within each target 120, they can be manually or automatically returned to the building 115 for another hit. For example, each target can include a collection point that includes a helical screw to capture and direct the golf balls to a vacuum intake point where the golf balls can be individually sucked through pneumatic tubes back to the building 115. Moreover, the golf balls can be individually washed and read again by an additional RFID reader at the building 115 before being placed back into play.

Figure 1B:
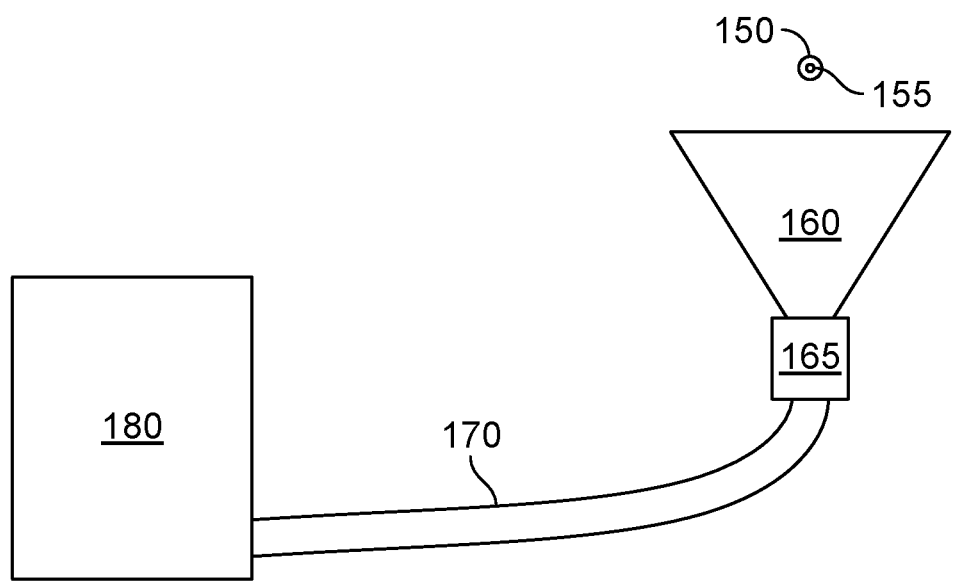
FIG. 1B shows an example of receiving and returning structures for RFID equipped golf balls, as can be used in a golf facility.

FIG. 1B shows an example of receiving and returning structures for RFID equipped golf balls, as can be used in the golf facility 100. Each golf ball 150 includes an RFID tag 155. Note that an RFID tag 155 includes both an antenna and control circuitry to implement the RFID functionality. The antenna can be separate from the control circuitry or integrated into the control circuitry. For example, in some implementations, the antenna and control circuitry are built into a single integrated circuit chip 155 that is embedded in the golf ball 150. Thus, as used herein, an RFID tag can refer to an RFID chip or other compact electronics package. As will be appreciated, various RFID structures and designs can be used, but the RFID tag 155 will generally not be visible as it is embedded in the golf ball 150; the tag 155 is shown in FIG. 1B for purposes of clarity in this disclosure. Moreover, each of the golf balls discussed below is an RFID equipped golf ball.

Moreover, various RFID technologies can be used in various implementations, including passive or active RFID, read only, field programmable or read/write RFID tags, and different frequency bands can be used to achieve different ranges and data speeds (e.g., Low Frequency (LF) from 120-150 kHz, High Frequency (HF) around 13.56 MHz, and Ultra High Frequency (UHF) about 433 MHz or 865-868 MHz or 902-928 MHz). In general, more durable but also less expensive RFID tags 155 should be used given the regular, large impacts that are experienced by the golf balls 150 in which they are embedded.

Once hit, many of the golf balls 150 fall into a target net 160 (or target net section 160) and pass through RFID reader 165 for identification; note that RFID readers are also referred to as RFID interrogators. The RFID reader 165 transmits a radio signal (e.g., an encoded radio signal) to interrogate the RFID tag 155. The RFID tag 155 receives the message and then responds with its identification and potentially other information. While shown as a single box attached to the target net 160 (or target net section 160), it will be appreciated that the RFID reader 165 can be distributed among two or more locations. For example, each target net section 160 can have its own baffle box that includes one or more antennas that are electrically connected with one or more RFID reader circuits located elsewhere. Thus, the RFID reader 165 can represent multiple antennas connected with a single RFID reader circuit or processor that operates all of the antennas. Various other combinations of RFID antennas and reader circuitry/processors can be used with each target, depending on the size of the target and the number of golf balls 150 to be read in a given period of time (e.g., based on average or peak ball volume).

The golf balls 150 that pass through the target nets 160 (or target net sections 160) can be routed through one or more tubes 170 to a golf ball testing system 180. For example, the golf balls 150 can be sucked through pneumatic tubes 170 to be delivered to a golf ball washing and testing system 180 located in the building 115. Other locations for the system 180 are also possible. In addition, other mechanisms or methods can be used to send the balls 150 to the testing system 180, including the golf balls that do not fall into a target 120 and are thus collected from the field (e.g., with a golf ball retriever vehicle).

Figure 2A:
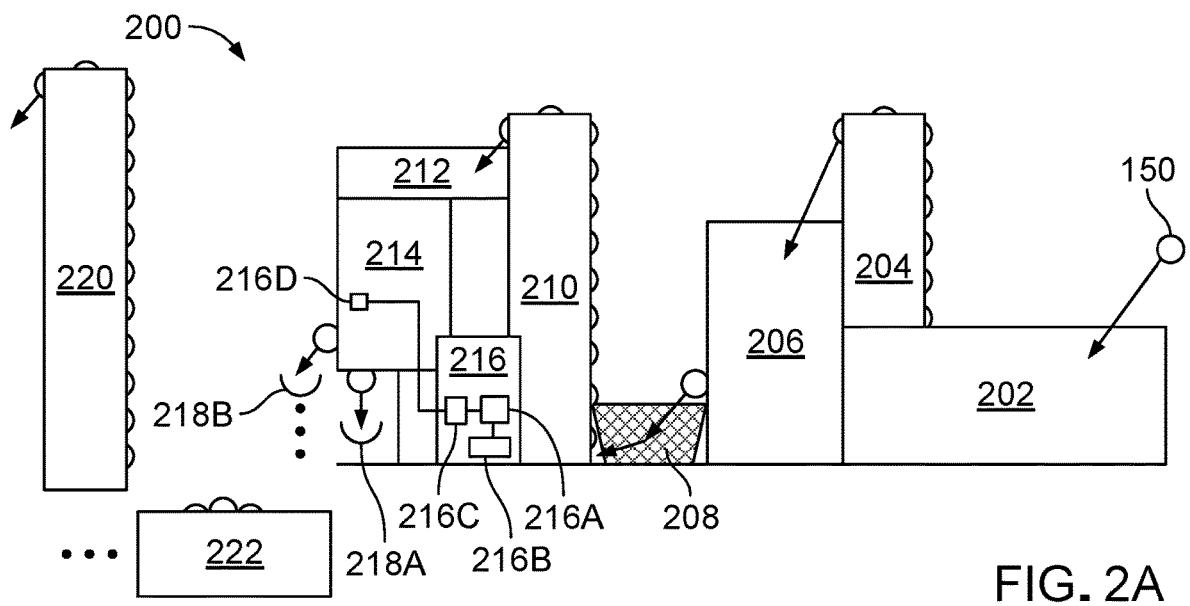
FIG. 2A shows an example of a golf ball washing and testing system.

As noted above, due to the regular, large impacts that are experienced by the golf balls 150, the embedded RFID tags 155 should be regularly tested. In some implementations, each golf ball 150 that is hit onto the golf range 110 is washed and tested before being returned to a golf bay in the building 115 for another round of game play. FIG. 2A shows an example of a golf ball washing and testing system 200, which can be employed as the system 180 in the building 115 or elsewhere.

The system 200 includes a wash bin 202 that receives golf balls 150 from the golf range. The wash bin 202 can include water, one or more solvents, one or more agitator mechanisms, or a combination thereof, used to wash the golf balls therein. In some implementations, the wash bin 202 includes a mechanical system to push the golf balls from one side to the other. In some implementations, the wash bin 202 is configured and arranged to allow gravity to supply the motive force to move the golf balls from one side to the other, e.g., newly added golf balls drop onto and push other golf balls in the bin 202 laterally.

Figure 2B:
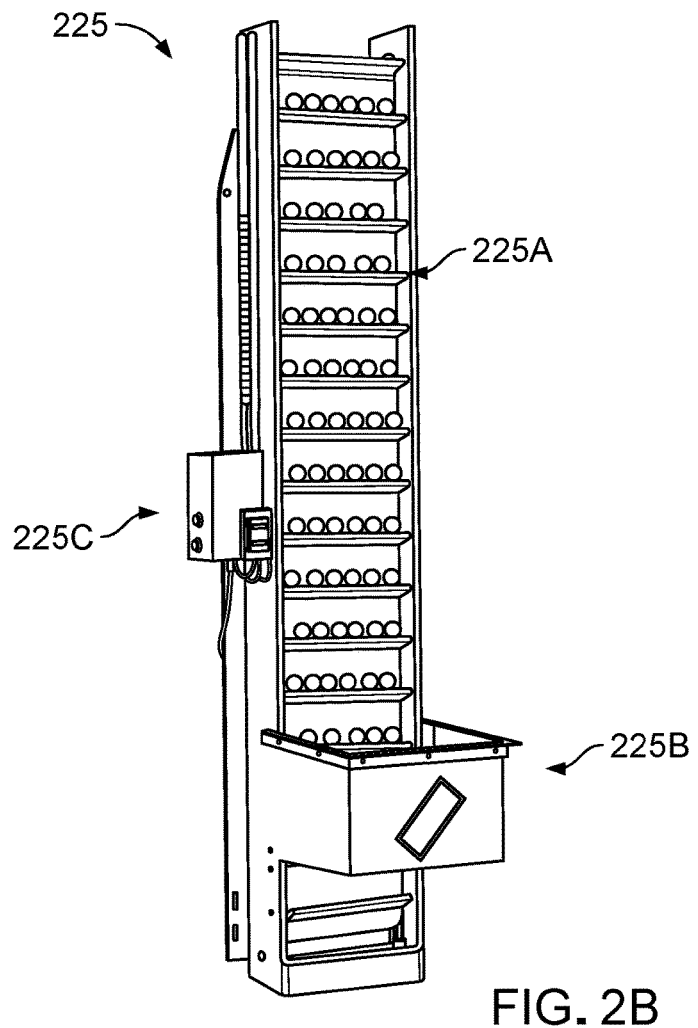
FIG. 2B shows a perspective view of an example of a golf ball elevator.

The washed golf balls are removed from the wash bin by a ball conveyor 204. For example, the ball conveyor 204 can be a ball elevator that sits inside the wash bin 202 and lifts the washed golf balls out of the wash bin 202, as shown. In some implementations, the ball conveyor 204 is a ball elevator available from Range Servant America, having a place of business in Norcross, Ga. FIG. 2B shows a perspective view of an example of a golf ball elevator 225 available from Range Servant America. As shown, the golf ball elevator 225 includes shelves 225A arranged to hold multiple golf balls in a line on each of the shelves 225A. The shelves 225A are on a movable conveyor belt that picks up golf balls from a receiver hopper 225B. The golf ball elevator 225 can include a controller 225C, which can implement both manual and automatic control functions. During operation, the golf ball elevator 225 lifts the golf balls out of the receiver hopper 225B and to the top of the elevator 225, and then drops the golf balls over the other side of the elevator 225 as the shelves 225A rotate over the top of the elevator 225 before returning to the bottom of the elevator 225 on the other side.

Various sizes and configurations of the golf ball elevator 225 can be used. Thus, as shown in FIG. 2A, a golf ball elevator 204 does not include a receiver hopper 225B because the wash bin 202 serves the function of holding golf balls in position for being picked up by the shelves 225A. Further, in the golf ball washing and testing system 200, when the golf balls are dropped over the other side of the golf ball elevator 204, they fall into a golf ball dryer 206. The golf ball dryer 206 can include one or more perforated surfaces, e.g., grating(s), one or more agitator mechanisms, one or more heaters, e.g., heated air blowers, or a combination thereof, used to dry the golf balls therein as they pass through. In some implementations, the golf ball dryer 206 includes a mechanical system to push the golf balls there through. In some implementations, the golf ball dryer 206 is configured and arranged to allow gravity to supply the motive force to move the golf balls there through, e.g., one or more angled surfaces direct added golf balls through the dryer 206, past an air blower, under the force of gravity.

In some implementations, an active dryer is not used. In some implementations, the golf ball cleaning operations are shared between two structures. For example, the wash bin 202 need not include agitator mechanism(s), and a ball scrubber 206 can include one or more agitator and/or scrubbing mechanisms to remove debris from the golf balls after they have been wetted in the wash bin 202.

As the golf balls are pushed or drop out of the dryer/scrubber 206, they are directed to a ball conveyor 210. In some implementations, the ball conveyor 210 is a ball elevator, such as a ball elevator 225, available from Range Servant America. Thus, in some implementations, the golf balls are pushed or drop out of the dryer/scrubber 206 into a receiver hopper 225B. Alternatively, a receiver hopper 225B is not used, and the golf balls simply roll down into a small receiving area immediately adjacent the ball elevator 210, where the golf balls can be picked up by the shelves of the ball elevator 210. Moreover, in some implementations, one or more angled and perforated surfaces 208, e.g., angled grating(s), are used to direct the golf balls to the ball elevator 210. The use of such perforated surfaces allows additional liquids to readily fall away from the golf balls as they drop onto and then roll down the perforated surface(s) 208.

In any case, the ball elevator 210 picks up and lifts the golf balls to the top of the ball elevator 210 on one side, and as the golf balls are dropped over the other side of the golf ball elevator 210, they fall into a test lane adaptor 212, which separates and directs the golf balls (e.g., under the force of gravity) to an RFID testing apparatus 214. The test lane adaptor 212 can load balance the golf balls by controlling the number of balls in any lane at a given time, which helps to avoid jamming. Further, RFID testing apparatus 214 has an associated controller 216 that operates the RFID testing apparatus 214. The controller operates the RFID testing apparatus 214 to detect golf balls that should be removed from service. In some implementations, each golf ball that passes the test on its embedded RFID tag travels all the way through the apparatus 214 and is then routed back to game play, while each golf ball that doesn't pass the test (or is otherwise in need of servicing) is kicked out of the apparatus 214 for special handling.

In some implementations, the golf balls that pass the RFID test drop into a chute 218A, which causes the golf balls to travel (under the force of gravity) back into service at the golf range. For example, the chute 218A can direct the passing golf balls to a golf ball conveyor 220. In some implementations, the ball conveyor 220 is a ball elevator, such as a ball elevator 225, available from Range Servant America. In some implementations, the golf balls that do not pass the RFID test are kicked out of the testing apparatus 214 and drop into a collection bin 222. In some implementations, the balls that are kicked out of the testing apparatus 214 fall into a chute 218B, which causes the golf balls to travel (under the force of gravity) to the collection bin 222. In some cases, the bad balls can be retested, as desired.

In addition, in some implementations, more than one collection bin 222 and more than two chutes 218A, 218B are used. For example, a first kick out level in the apparatus 214 can remove balls that are not adequately read and drop them into a first level chute 218B, which directs the balls to a first bin collection 222. These balls can then be retrieved for reconstruction/recycling or replacement. A second kick out level in the apparatus 214 can remove balls that are successfully read, but the identified balls have been flagged for removal from service for another reason. Such balls can be removed from the apparatus 214 and dropped into a second level chute 218B, which directs the balls to a second bin collection 222. These balls can then be retrieved for refurbishment or replacement.

For example, a program running in a control system for the testing apparatus 214 (or in a control system communicatively coupled with the control system for the apparatus 214) can pull golf balls from service after being hit more than a threshold number of times. The threshold can be set based on experience with the types of golf balls being used, where after a certain number of hits, the balls should be refurbished or refinished, e.g., painted and/or have a company logo reapplied. As another example, the golf facility 100 can use golf balls having different types of RFID tags therein, and the program running in the control system for the testing apparatus 214 (or in the control system communicatively coupled with the control system for the apparatus 214) can pull golf balls from service that have a particular type of RFID tag therein. In some cases, the RFID tag may need to be updated with new data or a new program before being put back into service. In some cases, the RFID tag may be outdated and so the golf balls with these RFID tags will be removed from service entirely, even though the RFID tag is still functioning properly.

The controller 216 can be a single controller or two or more controllers that work together. The controller(s) 216 can be implemented using one or more programmed computers, e.g., a programmable logic controller (PLC), and/or special purpose logic circuitry, e.g., an FPGA (field programmable gate array) or an ASIC (application-specific integrated circuit). The controller(s) 216 can include (or connect with) RFID reader circuitry/processor(s), which are connected with RFID antennas located inside the testing apparatus 214, as described in further detail below. Moreover, the controller(s) 216 can include (or connect with) one or more respective controllers 216 for the golf ball conveyors 204, 210, such as controller 225C. Thus, in some implementations, the controller 216 operates the testing apparatus 214 and the golf ball elevator 210 (and potentially also the golf ball elevator 204) to control the flow of golf balls through the system.

Figure 2C:
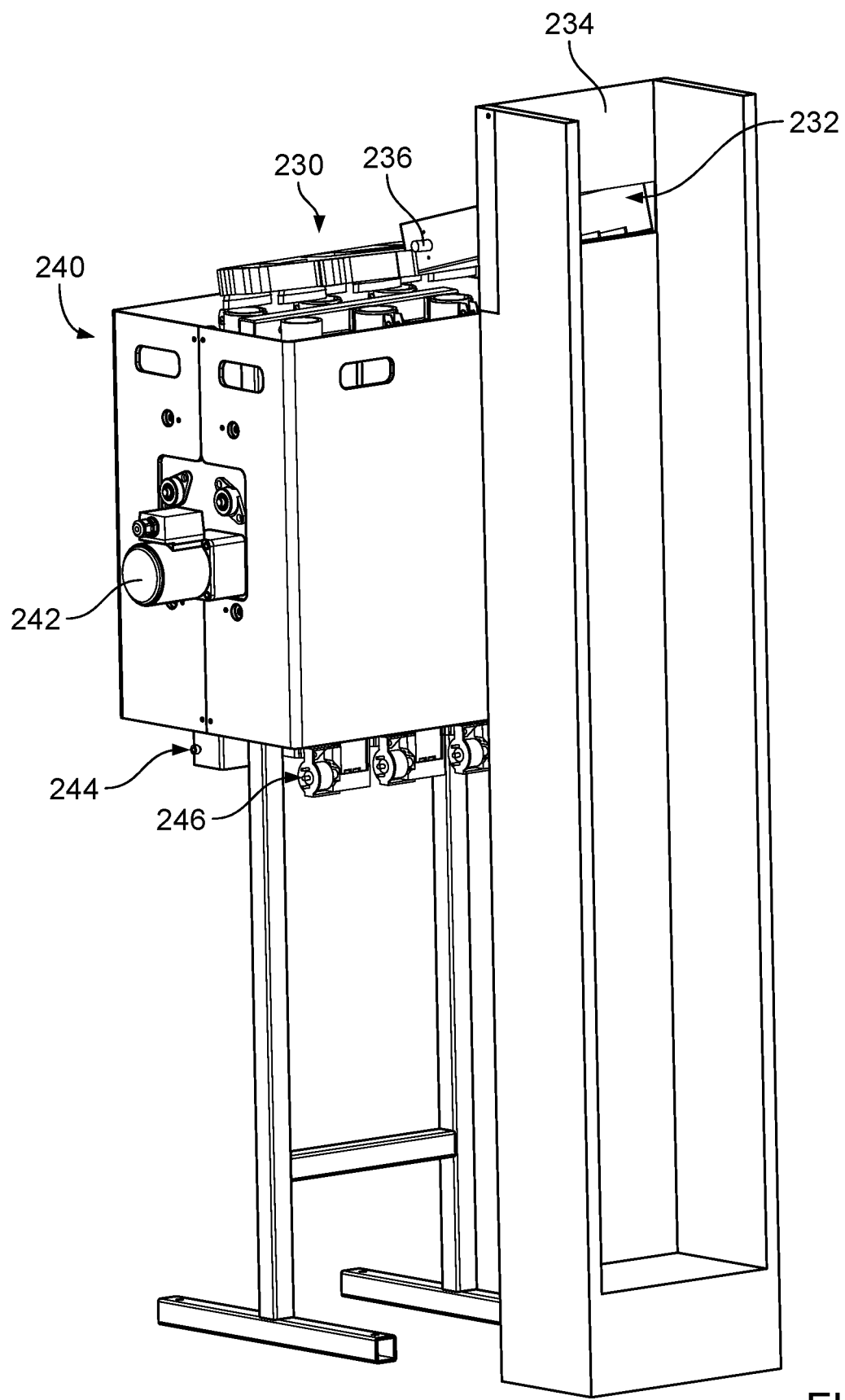
FIG. 2C shows a perspective view of an example of an RFID testing system.

FIG. 2C shows a perspective view of an example of an RFID testing system. The RFID testing system includes a test lane adaptor 230, which is an example of the test lane adaptor 212 from FIG. 2A. The RFID testing system also includes an RFID testing apparatus 240, which is an example of the RFID testing apparatus 214 from FIG. 2A. The RFID testing apparatus 240 is operated using a motor 242, which is electrically connected with a controller, e.g., controller 216, thus allowing the controller to turn the motor 242 on and off, as needed. In addition, in the example shown, the RFID testing apparatus 240 tests balls on two sides (rather than a single side, as shown in FIG. 2A) and thus, in addition to kickers 244 on the first side to kick balls out, the RFID testing apparatus 240 includes kickers 246 on the second side to kick balls out. Note that at least an additional chute will be included under the kickers 246 to catch the balls that pass through the kickers 246 and route those passing balls back into service for game play.

The RFID testing system is shown in FIG. 2C without the golf ball elevator in place so as to not obscure an opening 232 to the test lane adaptor 230. The opening 232 can be sized such that only a single line of golf balls on a single shelf of the golf ball elevator is allowed to drop onto the test lane adaptor 230 at a time; the golf balls on a next shelf will be held back by a panel 234 until the shelf aligns with opening 232. The panel 234 can be made of stainless steel, hard plastic, or other materials. The panel 234 can be positioned relative to the shelf of the ball conveyor such that, as the golf balls come over the top of the elevator, they fall onto the back side of the preceding shelf (note that this back side, which is the underside of the shelf when going up, is now the top side of the shelf when going down) and are compressed slightly between the back side of the preceding shelf and the panel 234.

This temporary compression lines up the golf balls in a straight row on the back side of the preceding shelf before the continued movement of the elevator allows the golf balls to fall through the opening 232 and onto the test lane adaptor 230. Thus, the panel 234 defines a controlled aperture 232 that can ensure each golf ball drops onto the test lane adaptor 230 with a controlled velocity, without slowing down the ball delivery, and can facilitate prevention of balls jamming in the test lane adaptor 230 and prevention of balls bouncing out of the test lane adaptor 230; only a single rows of balls are dropped into the test lane adaptor 230 at a time, and the distance of the drop is limited by the height of the opening 232 above the floor of the test lane adaptor 230.

The aperture width can be set based on the drive belt width and the opening of the ball elevator 210, e.g., 12.25 inches. The aperture height can be 3 inches high off the lowest portion of the opening for the ball elevator 210. The minimum aperture height can be 2 inches to allow for proper clearance for the balls to exit and have a low exit velocity. The maximum aperture height can be driven by two factors: (1) the minimum flight to flight distance (from shelf to shelf) on the elevator conveyor belt 210 (e.g., 4.5 inches), and (2) the maximum energy to be imparted to the golf balls when they leave the opening. Note that too much energy leads to bounce outs and excessive rebounding off of lane geometry. The ball should have enough energy to overcome any debris build up, energy losses from collisions with other balls, and frictional losses encountered in the lane feed tray. In some implementations, the aperture is adjustable, and in some implementations, the aperture is fixed at values determined by empirical testing.

Figure 2D:
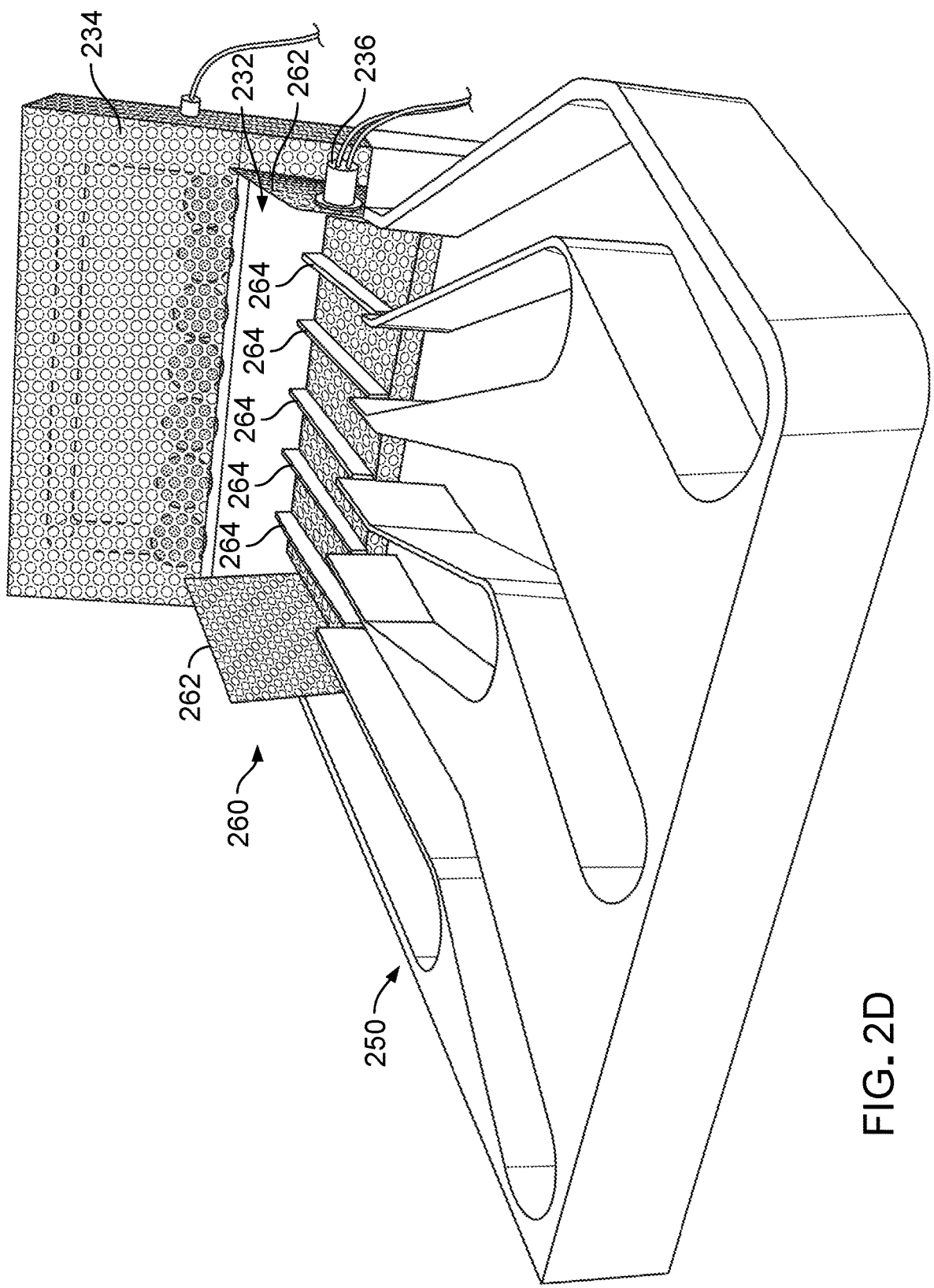
FIG. 2D shows an example of a test lane adaptor.

In some implementations, the test lane adaptor 230 has a sensor 236, e.g., an optical sensor, such as an infrared (IR) sensor, that is electrically connected with the controller, e.g., controller 216. The sensor 236 is used to detect when the golf balls have filled up the test lane adaptor 230, and so the elevator is temporarily stopped by the controller to allow the RFID testing apparatus 240 to catch up. FIG. 2D shows an example of a test lane adaptor, which includes a ball lane router 250 and a ball lane sorter 260. As shown, a row of golf balls are currently held by the panel 234 and will drop into the ball lane sorter 260 once the elevator moves the shelf to the opening 232.

The ball lane sorter 260 can be made of stainless steel, hard plastic, or other materials. The ball lane sorter 260 is arranged to receive the golf balls into predefined lanes and deliver the golf balls to the ball lane router 250 in response to gravitational force acting on the golf balls. The ball lane sorter 260 is an example of a feed tray that has been designed with a specific geometry to help prevent jamming of balls at the entry points to the ball lane router 250. The ball lane sorter 260 is an inclined tray having side walls 262, 264 that define the predefined lanes. In this example, there are six predefined lanes corresponding to six testing lanes in the RFID testing apparatus (not shown). Other numbers of predefined lanes are also possible. In any case, the side walls of the ball lane sorter 260 include two exterior walls 262 that are taller than the golf balls and two or more interior walls 264 that are shorter than the golf balls. This geometry can facilitate the golf balls arranging themselves into the predefined lanes, under the force of gravity, before entering the ball lane router 250.

The ball lane router 250 can be made of hard plastic, stainless steel, or other materials. The ball lane router 250 is arranged to deliver the golf balls to respective feed tubes (not shown) in response to gravitational force acting on the golf balls. Note that the separate paths in the ball lane router 250 should be sized to avoid jamming of the golf balls. Thus, each path should be wide enough to allow each individual golf ball to roll freely down the incline of the ball lane router 250, but not so wide that the golf balls can jam against each other and the walls of the path. For example, the minimum lane width (for minimum ball clearances with any debris and/or defects) can be 1.75 inches, and the recommend lane width can be 2 inches±0.15 inches, which allows clearance for debris and variations in ball geometry. The maximum lane width can be 2.375 inches to prevent static golf balls waiting to be fed into the system from interlocking against other balls and the lane sidewalls. The maximum recommend single deflection angle is 45 degrees; note that all abrupt directional changes to the ball path should be kept at a minimum, and all inside and outside corners at directional changes should be radius-ed to the maximum amount allowed by lane geometry, e.g., 1-3 inches radius curves.

The delivery of the golf balls to the test lane adaptor by the elevator can be faster than the testing apparatus can test the RFID tags embedded in the golf balls. Thus, once the golf balls fill up the feed tubes, the golf balls will fill up the routing paths in the ball lane router 250, and then start to back up into the ball lane sorter 260. When this happens, the sensor 236 detects the presence of the golf balls in the ball lane sorter 260, e.g., the IR sensor controller can detect when an object passes in front of the IR sensor for a predefined period of time, which triggers the controller, e.g., controller 216, to stop the delivery of balls by the elevator. Once the RFID testing apparatus processes more golf balls, the sensor 236 will detect the clearance of the golf balls, and the controller can then restart the elevator, e.g., after a predefined and/or programmable time delay.

In addition, in the example shown, the panel 234 and the ball lane sorter 260 include perforated surfaces, e.g., grating (s). Including such perforations allows water and any remaining debris from ball washing to pass through the perforations while also allowing the golf balls to roll freely in response to gravitational force acting on the golf balls. The diameters of the drainage holes can be from 0.25 to 0.062 inches, and the minimum edge to edge distance between holes can be half of the given hole diameter. Note that holes larger than 0.25 inches can risk the golf balls getting caught by the hole, and holes smaller than 0.062 inches may be ineffectual for drainage and be easily clogged. Such holes/perforations can help prevent water or debris from getting into RFID testing apparatus, which can affect RFID reading.

Figure 2E:
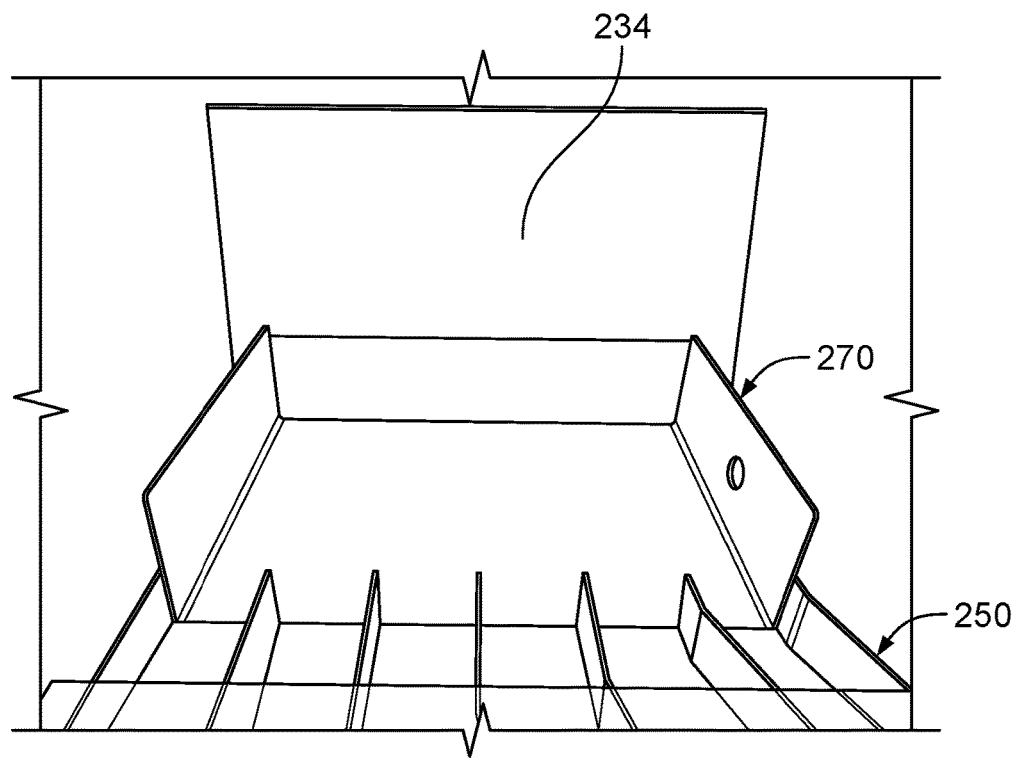
FIGS. 2E and 2F show another example of a test lane adaptor.
Figure 2F:
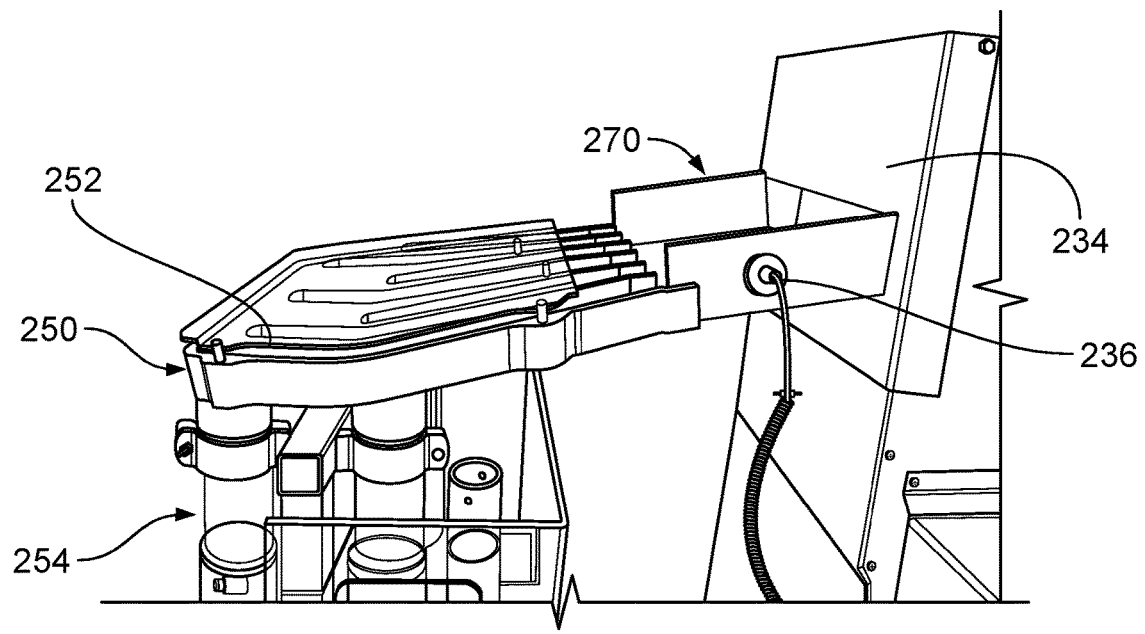

However, in some implementations, such perforations are not included in one or both of the panel 234 and the ball lane sorter 260. FIGS. 2E and 2F show another example of a test lane adaptor. In this example, the test lane adaptor includes a feed tray 270 that does not include perforations, and the panel 234 also does not include perforations. The feed tray 270 can be made of stainless steel, hard plastic, or other materials. In addition, in this example, the feed tray 270 does not include predefined lanes, but rather is a simple inclined plane leading to the ball lane router 250, albeit with exterior side walls to prevent the golf balls from bouncing out of or rolling off the feed tray. As shown in FIG. 2F, the ball lane router 250 can include a cover 252, and also shown in FIG. 2F are feed tubes 254 of the RFID testing apparatus. Moreover, in some implementations, the feed tray 270 (without the interior side walls defining lanes) includes perforations, such as used with the ball lane sorter 260.

In any case, the sensor 236 can be positioned where the ball lane sorter 260 or feed tray 270 meets the ball lane router 250, i.e., it is within a predefined distance from the ball lane router 250 such that ball delivery is stopped before new balls can drop onto backed up balls and thus bounce over the exterior side walls, and the sensor 236 is connected to the controller (not shown) for use in triggering stops and starts of the golf ball elevator. Returning to FIG. 2A, in general, controller 216 represents a control system for the testing apparatus, but the controller 216 can also represent a control system for a larger set of components used to manage the ball retrieval, washing, testing and returning operations. Thus, rather than a single controller location, as shown, the control system 216 can have it components distributed among two or more locations, with those components being communicatively coupled with each other, e.g., with wired and/or wireless connections.

The control system 216 can implement the processes described herein using a computer, e.g., a PLC, that executes one or more computer programs to perform the described operations, using special purpose logic circuitry, e.g., an FPGA or an ASIC, or a combination thereof. In some implementations, the control system 216 includes one or more hardware processors 216A, and one or more non-transitory computer-readable mediums 216B tangibly encoding one or more programs that run on the processor(s) 216A. Further, the control system 216 can include or connect with one or more RFID reader circuits 216C, which connect with RFID antennas 216D located along testing paths of the golf ball testing lanes in the RFID testing apparatus 214. In general, the operations of the control system 216 and/or the RFID readers can be implemented using digital electronic circuitry, or in computer software, firmware, or hardware, including using one or more modules of computer program instructions encoded on a computer-readable medium for execution by, or to control the operation of, data processing apparatus.

Figure 3A:
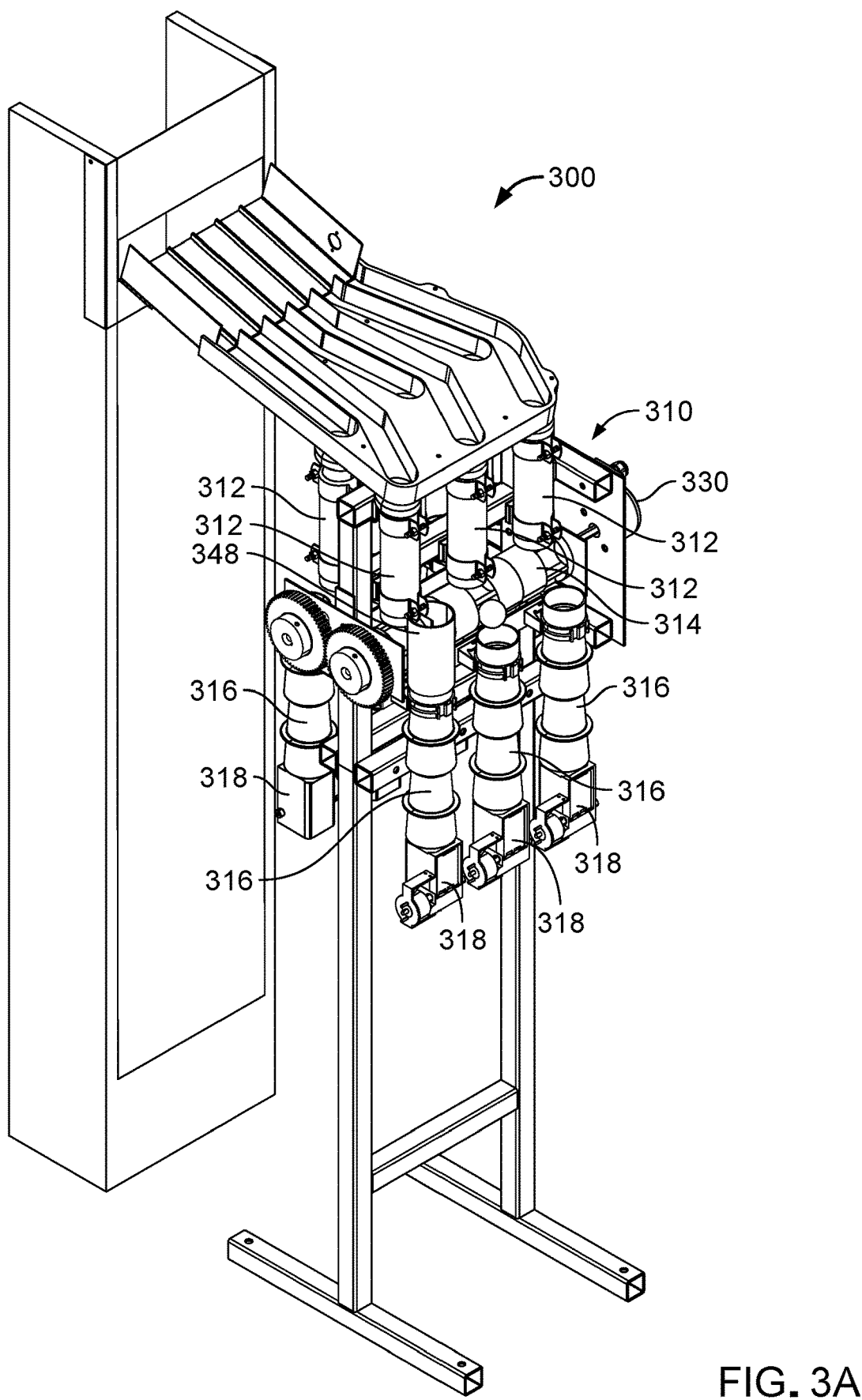
FIG. 3A is a perspective view showing internal structures of an example of an RFID testing apparatus with a test lane adaptor therefor.

FIG. 3A is a perspective view showing internal structures of an example of an RFID testing apparatus 310 with a test lane adaptor 300 therefor. Note that the housing and some other components of the RFID testing apparatus 310 have been removed so as to not obscure various internal structures. The RFID testing apparatus 310 includes feed tubes 312, which receive the golf balls from the test lane adaptor 300. Below the feed tubes 312 are a first star wheel unit 314, which is rotated using a motor 330, and a second start wheel unit (not shown).

Figure 3B:
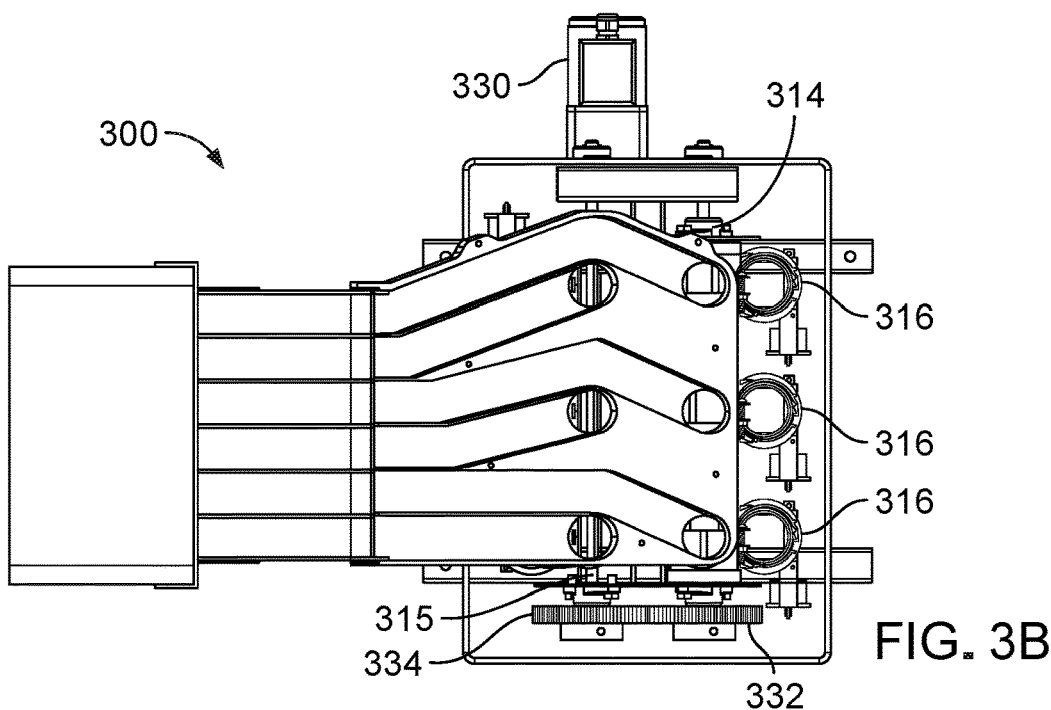
FIG. 3B is a top view of the test lane adaptor above the RFID testing apparatus of FIG. 3A.

FIG. 3B is a top view of the test lane adaptor 300 above the RFID testing apparatus 310 of FIG. 3A. As shown, the motor 330 drives a first axle on which the first star wheel unit 314 (on one side) is mounted, and the first axle drives a first gear 332 that connects with a second gear 334, which drives a second axle 315 on which the second star wheel unit (on the other side) is mounted. In some implementations, the motor 330 drives the star wheel units using a chain drive and slip clutch, which can facilitate avoiding lock-up of the machine and can improve safety, as any object that gets into the gearing (e.g., a person's finger) will only experience minor compression before the slip clutch will prevent further increase in force being applied by the motor 330. Other configurations for driving the star wheel units are also possible. In any case, as each star wheel turns, it receives golf balls in cavities (formed by the spokes of each respective star wheel in each star wheel unit) as those cavities rotate under the feed tubes.

Figure 3C:
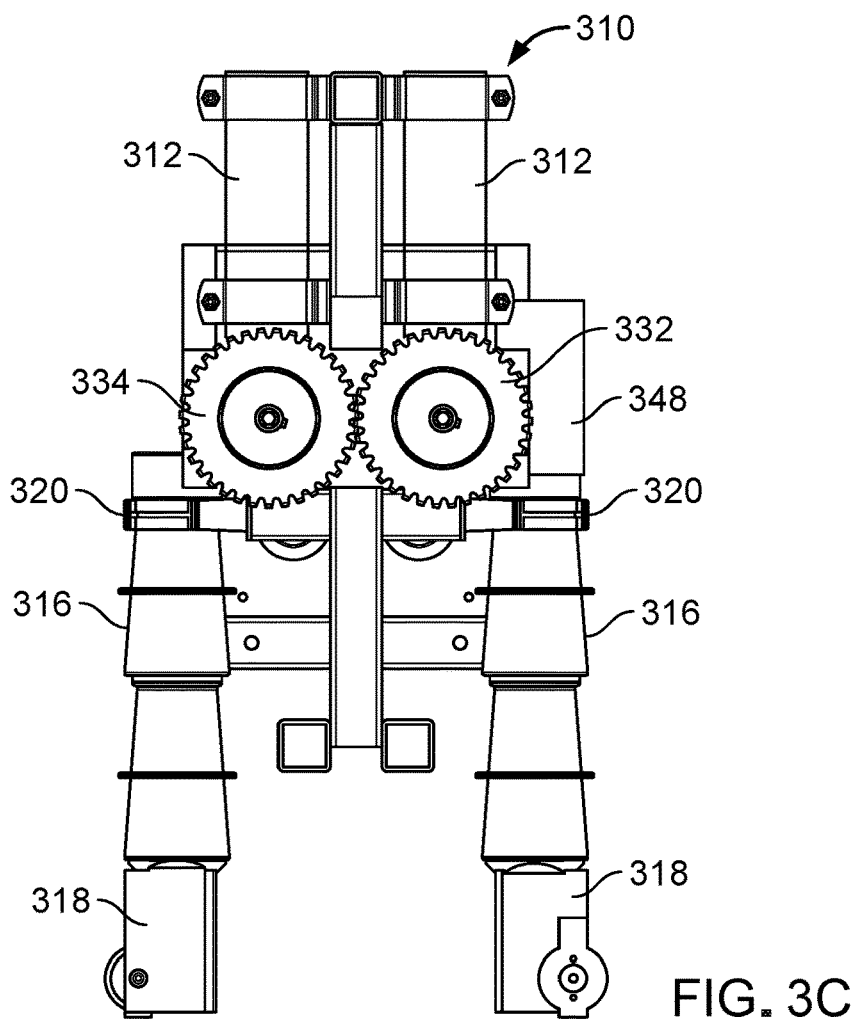
FIG. 3C is a side view of the RFID testing apparatus of FIG. 3A.
Figure 3D:
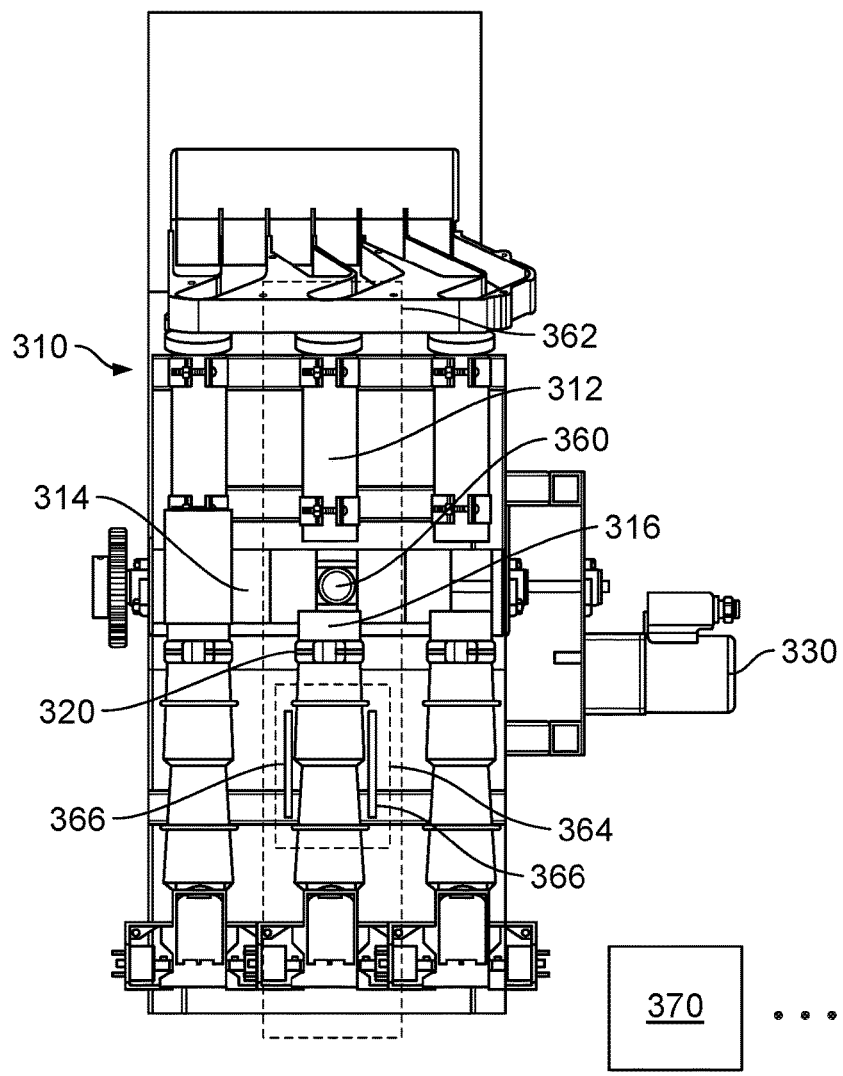
FIG. 3D is a front view of the RFID testing apparatus of FIG. 3A.
Figure 3E:
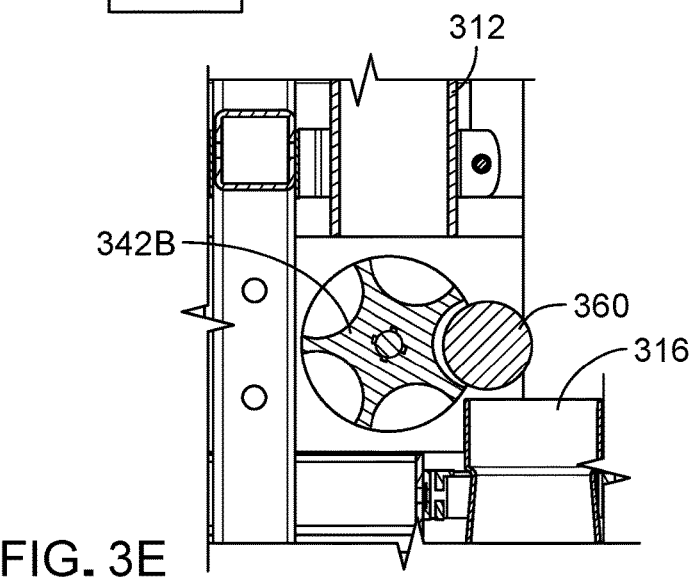
FIG. 3E is a cutaway view of a portion of the RFID testing apparatus of FIG. 3A.
Figure 3H:
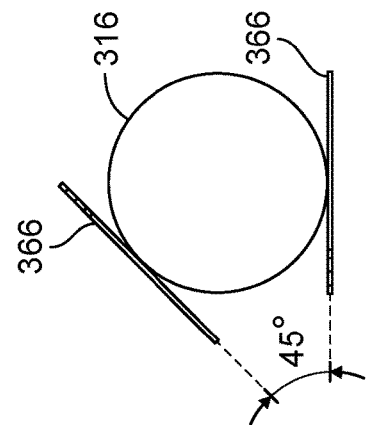
Figure 3G:
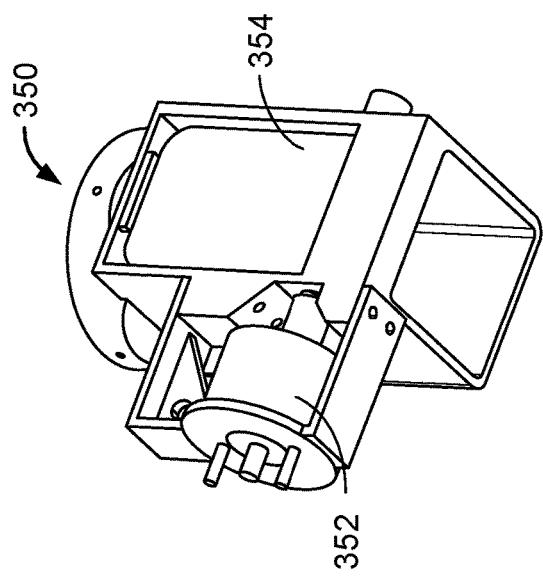
FIG. 3G is a perspective view of a kicker usable in the RFID testing apparatus of FIG. 3A.
Figure 3F:
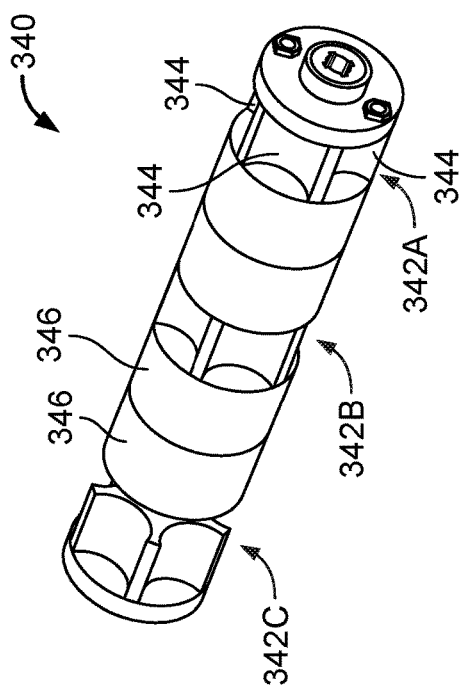
FIG. 3F is a perspective view of a star wheel unit usable in the RFID testing apparatus of FIG. 3A.

FIG. 3F is a perspective view of a star wheel unit 340 usable in the RFID testing apparatus of FIG. 3A, as star wheel unit 314. The star wheel unit 340 includes three star wheels 342A, 342B, 342C having cavities 344, which are sized to receive the golf balls and then rotate the golf balls about the center of rotation of the star wheel unit 340, as the star wheel unit 340 rotates. There are five cavities 344 in each star wheel 342A, 342B, 342C, and in this example, there are three star wheels 342A, 342B, 342C that correspond to the three golf ball testing lanes on each of the two side of the RFID testing apparatus 310, i.e., two star wheel units 340 are used in the RFID testing apparatus 310. Other implementations use different numbers of star wheels, such as four, five, six, seven, eight or nine star wheels per star wheel unit 340.

The star wheel unit 340 can be constructed from hard plastic or other materials. The star wheel unit can be constructed using CNC (computer numerical control) machining or 3D (three dimensional) printing systems and techniques. In addition, in some implementations, each star wheel unit 340 is constructed in a modular fashion, which allows the number of star wheels to be readily changed when more golf ball testing lanes are to be added to the system. As shown in FIG. 3F, spacers 346, e.g., spacer wheels, can be used to set the needed distance between the testing lanes, and a final star wheel 342C of the star wheel unit 340 is being added to the star wheel unit. With the appropriate number of star wheels added for a given RFID testing apparatus being constructed, the pieces of the star wheel unit 340 are affixed to each other, e.g., with adhesive, bolts, etc., and the star wheel unit 340 is ready to be added to the RFID testing apparatus.

In addition, note that the spokes of the star wheels 342A, 342B, 342C of the star wheel unit 340 are offset from each other. Thus, each star point in one set of star wheel cavities can be aligned with the trough of a cavity in an adjacent star wheel. This offsetting of the cavities in the star wheel unit 340 from each other creates the alternating timing of golf ball testing in each testing lane. This can reduce RF cross-talk and interference as the golf balls do not pass through adjacent read zones at a same time.

Note that reduction in RF cross-talk and interference can be achieved without the star wheel spokes being offset to exactly match a spoke in one star wheel with the deepest part of the cavity in the adjacent star wheel. In some implementations, each star wheel is a five spoke star wheel, and each star wheel unit has four keyways providing four different rotational positions for each star wheel of the star wheel unit. The alternating timing of the golf ball testing can still be achieved, and the amount of spacing/timing between the balls during testing can be adjusted by changing the speed of the motor 330 so as to reduce RF cross-talk and interference.

FIG. 3A shows a single golf ball dropping out of a cavity in the star wheel unit 314 and into a path 316 through a read zone. However, as will be appreciated, the golf balls delivered by the test lane adaptor 300 will fill up each of the feed tubes 312 for each testing lane, and as each star wheel unit rotates, golf balls will drop out of the feed tubes 314 into the cavities, and then drop out of the cavities into the read zone paths 316, with alternating timing. In this example, where there are three golf ball testing lanes on each side of the RFID testing apparatus 310, the testing will (per side) alternate between testing two golf balls in parallel in the outer testing lanes and testing a single golf ball in the inner testing lane, and each golf ball will either pass through or be kicked out by the kicker 318 in its respective testing lane. In addition, while only a single lane guide 348 (which ensures that golf balls dropping out of a star wheel cavity enters the read zone paths 316) is shown in FIGS. 3A and 3C, it will be appreciated that each star wheel has a corresponding lane guide, i.e., six lane guides 348 in this example. Further, note that the feed tubes 312 and other components of the RFID testing apparatus 310 along the golf ball testing lanes can be made of hard plastic, e.g., PVC (polyvinyl chloride) or a clear plastic material to facilitate visual identification of any jams within the apparatus.

FIG. 3C is a side view of the RFID testing apparatus 310 of FIG. 3A. In this view, two of the testing lanes are visible, each testing lane including a feed tube 312, a portion of a star wheel unit (not shown), a sensor 320, a read zone path 316, and a kicker 318. The sensors 320 can be optical sensors (e.g., IR sensors) or other sensors and are used to detect when a golf ball enters a path of a read zone. Each sensor 320 is communicatively coupled (e.g., by wire or wirelessly) to a controller, e.g., controller 216, to provide information regarding a time at which a golf ball enters its read zone path 316. In response to the signal from each sensor 320, the controller checks whether the RFID tag in the golf ball is read within a predefined (e.g., programmable) time period after the time at which the signal from the sensor 320 indicates the ball entered the read zone path 316.

If the RFID tag in the golf ball is not adequately read within the predefined time period, as the ball passes through the read zone path 316, the controller activates the kicker 318 to change the golf ball's direction of travel. Thus, any bad balls are kicked out of the testing apparatus 310 and routed to a bin (or other location) for reconstruction/recycling or replacement. On the other hand, if the RFID tag in the golf ball is adequately read within the predefined time period, as the ball passes through the read zone path 316, the controller does not activate the kicker 318, and the ball is allowed to pass through the kicker 318 and then be routed back to game play. Note that the sensor 320 can also be placed after the read zone to provide information regarding a time at which the golf ball leaves its read zone path 316, as described in further detail below in connection with FIG. 4A.

FIG. 3G is a perspective view of a kicker 350 usable in the RFID testing apparatus of FIG. 3A, as kickers 318. The kicker 350 includes a solenoid 352 connected to a spring-loaded door 354 that changes orientation, responsive to the solenoid 352 engaging the spring, to prevent a golf ball from passing through the kicker 350 when the kicker 350 is activated, e.g., using a low-voltage power signal triggered by controller 216. Other types of kickers can also be used. In addition, rather than kicking out bad balls, the kicker can kick out good balls, provided the routing of the balls is also changed. However, using the default "open" position of each kicker 350 for good balls, thus allowing good balls to fall through the kicker 350 and back into circulation is preferable, as most tested balls will be good, and this configuration will thus reduce wear and tear on the kickers 350.

Moreover, note that "bad balls" includes golf balls for which no RFID read signal was obtained and also golf balls for which the quality or timing of any read signal obtained (e.g., a weak RF signal strength) was below a threshold set to ensure that marginally bad balls are not routed back to game play, i.e., the RFID tags in the golf balls are not adequately read. Further, as noted above, in some implementations, more than one kick out level can be used. Thus, two kickers 350 can be included in each testing lane, where the first (or second) kicker 350 removes golf balls that are not adequately read (for reconstruction/recycling or replacement), and a second (or first) kicker 350 removes golf balls that are successfully read but that have also been flagged for removal from service for another reason (e.g., a company logo should be reapplied or the RFID tag is of an older type that is being retired).

FIG. 3D is a front view of the RFID testing apparatus 310 of FIG. 3A. This view shows three testing lanes on one side of the RFID testing apparatus 310 and a golf ball 360 that is traveling through the center testing lane 362. FIG. 3E is a cutaway view of a portion of the RFID testing apparatus of FIG. 3A. As shown, the golf ball 360 has been delivered by the feed tube 312 to a cavity in the star wheel 342B of the star wheel unit 314, and the golf ball 360 is about to fall out of this cavity and into a path 316. In some implementations, the feed tube 312 is adjustable to accommodate onsite adjustments to allow the ball to pass through. Other configurations are also possible, as described further below in connection with FIG. 4C. Returning to FIG. 3D, each path 316 travels through a corresponding read zone 364, where antennas 366 of an RFID reader are used to interrogate the RFID tag inside the golf ball 360 as the golf ball 360 travels through the read zone 364.

In order to increase the time that the golf ball spends in the read zone 364, each path 316 can be formed by a housing that defines a helical track arranged to cause the golf ball 360 to spiral down the helical track in response to gravitational force. In addition, the helical track can cause the golf ball 360 to assume different orientations with respect to the antennas 366 as the golf ball 360 travels through the read zone 364, thus increasing the chances of a successful read of the RFID tag. Also, the use of a helix in the read zone can mitigate any need to align antennas in a specific configuration and reduces the risk of a false negative RFID detection. For further details regarding such helical tracks for golf balls, see U.S. Pat. No. 7,337,965, which is hereby incorporated by reference. In some implementations, a helix is not used and is replaced with another structure that induces changes to the golf ball's rotation and angle of incidence to the antenna(s), such as the use of staggered paths, curved ramps or protrusions (to induce rotation) and/or the use of plastic villi/bristles (to induce rotation through friction as the golf balls fall).

Each read zone 364 can include one or more antennas 366 of one or more RFID readers 370. In some implementations, a single RFID reader 370 is multiplexed among all the read zones of all the testing lanes for the RFID testing apparatus. In some implementations, two or more RFID readers 370 are used for two or more sets of golf ball testing lanes, e.g., a first RFID reader 370 for a first side of the RFID testing apparatus 310, which includes the testing lane 362, and a second RFID reader 370 for a second side of the RFID testing apparatus 310. In some implementations, a separate RFID reader 370 is used for each of the read zones 364.

In some implementations, each testing lane has two RFID antennas, e.g., a first antenna oriented in a first position and a second antenna oriented in a second position, e.g., rotated 90 degrees away from the orientation of the first position, which improves the chances of reading the golf ball's embedded RFID tag when the antennas need a direct line of sight to the ball. Thus, for an RFID testing apparatus with six testing lanes, there can be twelve RFID antennas. In some implementations, the antennas 366 can be shared among the read zones. For example, one of the two antennas 366 can be used in combination with another antenna (not shown) oriented 90 degrees away from it (in the plane of the drawing sheet, over the center testing lane 362) when testing a golf ball in the center testing lane 362, the left-side antenna 366 can be used with another antenna (not shown) oriented 90 degrees away from it (in the plane of the drawing sheet, over the left-most testing lane) when testing a golf ball in the left-most testing lane, and the right-side antenna 366 can be used with another antenna (not shown) oriented 90 degrees away from it (in the plane of the drawing sheet, over the right-most testing lane) when testing a golf ball in the right-most testing lane.

The antennas 366 can be near-fielded and have a polarization type, e.g., linear or circular type polarization. In addition, each antenna 366 can be accompanied by a wall or walls made of RF shielding or absorbing material(s) to reduce RF interference between golf ball testing lanes. Further, in addition to constructing the RF reading zone of each golf ball testing lane with different materials, including RF shielding or absorbing materials, in some implementations, each reading zone is fully enclosed to form a Faraday cage during the RFID interrogation period.

In some implementations, the antennas 366 are linearly polarized antennas that are used in a diversity setup. Two linearly polarized antennas are oriented differently around the path of travel in each lane to improve the chance of reading the golf ball's embedded RFID tag. For example, two antennas 366 per lane can be oriented at a forty five degree angle with respect to each other and be dedicated for use with the lane they contain. FIG. 3H shows an example of two antennas 366 containing a read zone path 316 and being oriented at a forty five degree angle with respect to each other.

In some implementations, rather than direct line of sight antennas, RFID antennas that emit a cloud of RF signal can be used, which can result in good reads with only one antenna 366 per golf ball testing lane, e.g., six antennas for six golf ball testing lanes in the RFID testing apparatus 310. In some implementations, a Taoglas ISPC.91A.09.0092E antenna is used, available from Taoglas Group Holdings Limited of Wexford, Ireland. Thus, a right hand circularly polarized antenna 366 can be used per lane, where the antenna 366 is oriented so its ground side faces away from the path of travel of the golf ball in the lane (ninety degrees to the path of travel of the golf ball in the lane).

FIG. 3I shows an exploded view of a portion of an example golf ball testing lane 380, which includes a single near-fielded antenna 382 with a right-hand circular polarization containing a read zone path 316. FIG. 3J shows a side view of the portion of the example golf ball testing lane 380. Note that using a single near-fielded antenna 382 with a right-hand circular polarization per golf ball testing lane can improve performance of the system. Due to the nature of each golf ball, the orientation of its RFID tag is unknown inside the read zone 364. Therefore, the usage of a circularly polarized antenna in addition to the helical travel path of each ball can improve the chances of RFID detection. The effect of each antenna can be enhanced by coupling it with a housing made of an RF reflecting material. In some implementations, an antenna mount 384 is used to connect the antenna 382 with the read zone path 316. In some implementations, the housing made of an RF reflecting material is an u-shaped metal shield 386 that is located around the near-fielded and circularly polarized antenna 382. Note that having the ground side of the antenna 382 face the metal 386 reduces its radiated back lobe. Additionally, RF absorbing materials can be placed around each lane to further reduce the risk of cross-reads between lanes.

Moreover, the RFID testing apparatus can be constructed from modular pieces to allow variations in a number of golf ball testing lanes. For example, an extended axle can be used with each star wheel unit, and additional star wheels (and spacers) can be added to the axle to increase the overall width of the apparatus and allow for additional lanes to process golf balls. Corresponding changes can also be made to the test lane adaptor, or additional test lane adaptors and ball supply devices (e.g., ball elevators) can be used. In some implementations, a separate RFID reader is added for each three golf ball testing lanes. The modular design can also be used to allow the addition of kickers to remove golf balls for other reasons, as described above.

In addition, because the RFID testing apparatus is gravity fed, the apparatus can be placed in various locations, including being mounted to a wall, provided additional components (elevators, hoppers, washers, etc.) are designed to connect the RFID testing apparatus with existing infrastructure. Thus, the golf ball testing system can be readily expanded to increase capacity by adding lanes and adding readers. Other variations are also possible.

Figure 4A:
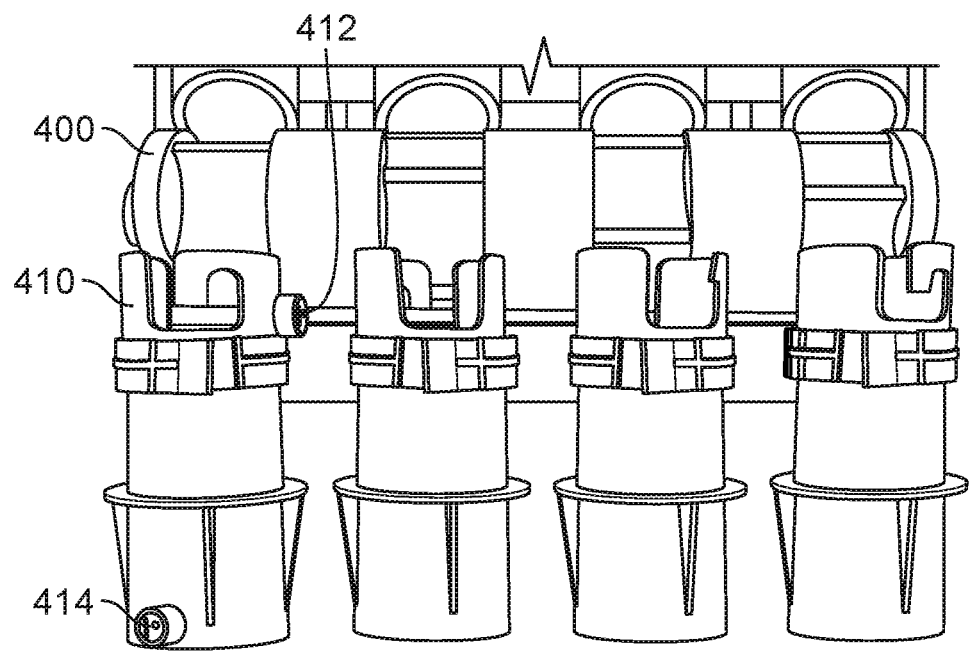
FIG. 4A shows another example of a star wheel unit and associated testing paths.

FIG. 4A shows another example of a star wheel unit 400 and associated testing paths 410. The star wheel unit 400 includes four star wheel unit pieces (sets of cavities) for four golf ball testing lanes. In addition, each testing path 410 for each testing lane can include both an input gate sensor 412 (as described above, e.g., an optical sensor, such as an IR sensor) and an output gate sensor 414 (e.g., an optical sensor, such as an IR sensor). Using an output gate sensor 414 allows confirmation that the golf ball is out of the read zone, thus allowing confirmation of a bad ball without relying on a predefined time period. In addition, in some implementations, rather than using input gate sensors 320, 412, only output gate sensors 414 are used in combination with a predefined time period; in this case, the controller determines whether a successful RFID read occurred within a predefined (e.g., programmable) time period before detection of the golf ball by the output gate sensor 414.

Figure 4B:
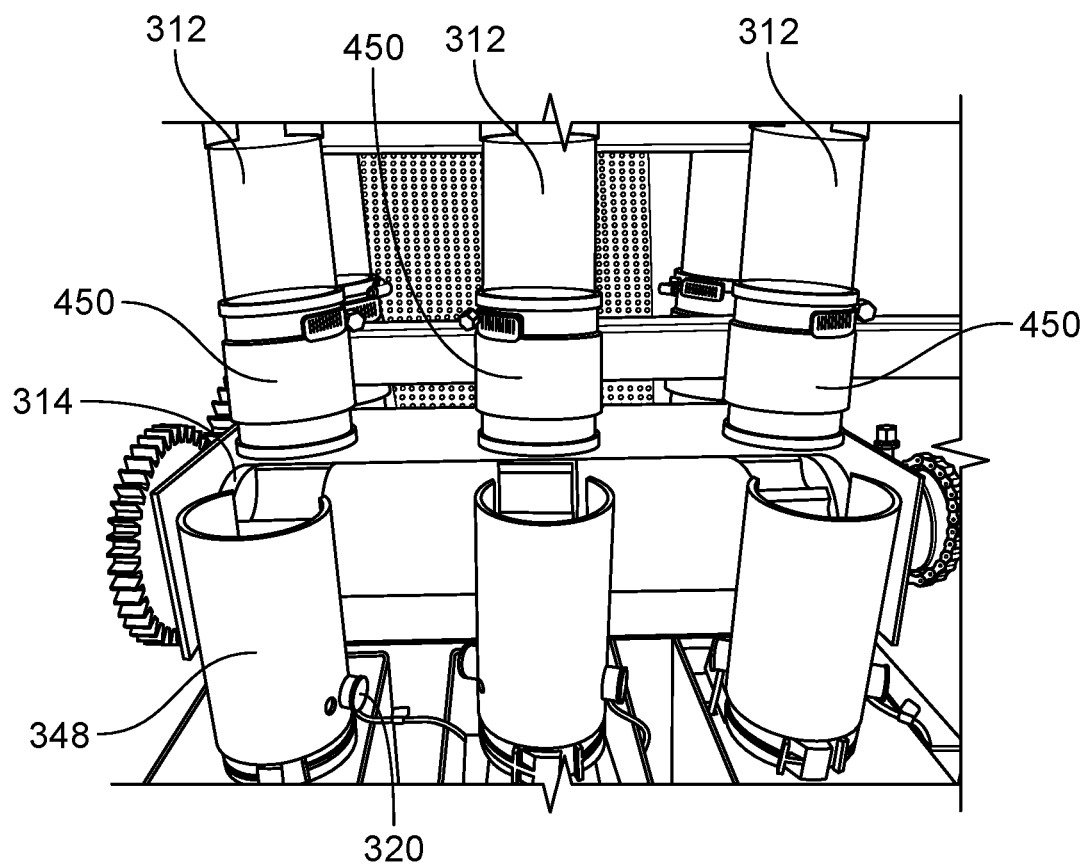
FIG. 4B shows an example of feed tubes usable in an RFID testing apparatus.

FIG. 4B shows an example of feed tubes usable in an RFID testing apparatus. In some cases, the use of a stiff material (e.g., hard plastic) for feed tubes 312 can cause jamming. As a golf ball drops into a cavity in the star wheel unit 314, the positioning of the golf ball may be such that it jams between the feed tube 312 and the approaching star wheel spoke of the star wheel unit 314. To address this issue, a flexible material (e.g., rubber) can be used to form a final section or portion 450 of each feed tube 312. This flexible end portion 450 of each feed tube allows the feed tube to bend just enough, when a golf ball is pressed between the inner edge of the tube and the oncoming spoke of the star wheel, to allow the golf ball to escape the jam location and drop out of the cavity of the star wheel.

Figure 4C:
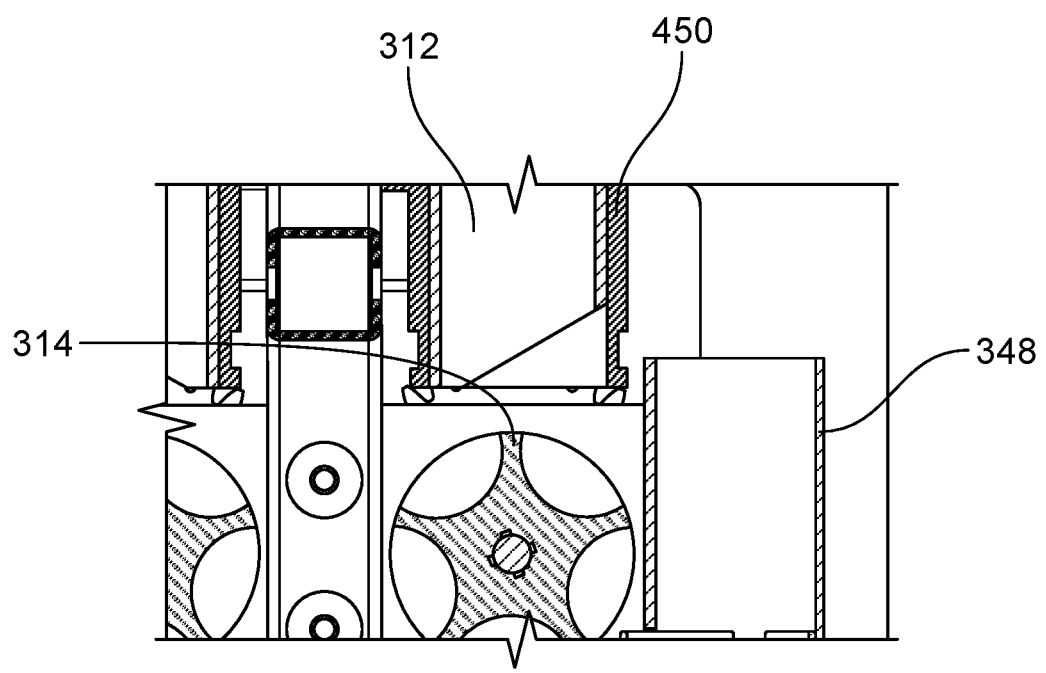
FIG. 4C is a cutaway view of a portion of the feed tubes of FIG. 4B.

FIG. 4C is a cutaway view of a portion of the feed tubes of FIG. 4B. Clearance issues for the golf balls can be mitigated by changes to each feed tube 312 output geometry. The feed tube 312 outputs can be cut at an angle, e.g., a 60 degree angle, as shown in FIG. 4C. The rear rigid portion of the feed tube 312 (the left side in FIG. 4C) prevents the golf ball from falling back behind the rising edge of the star wheel in the star wheel unit 314. The lowest edge of the feed tube 312 can be set to 0.61 inches above the outside radius of the star wheel to prevent lockup. The forward included angle and distance prevents a golf ball from jamming between the star wheel leading edge and the wall of the feed tube. The rubber sleeve 450 supports the golf ball during feeding while being able to deflect under load. To make up for minor variances in tolerances and assembly, each rubber sleeve 450 can be adjusted in the field until it just clears the golf ball as it rotates into the lane guide 348 and into the lane below.

Figure 5A:
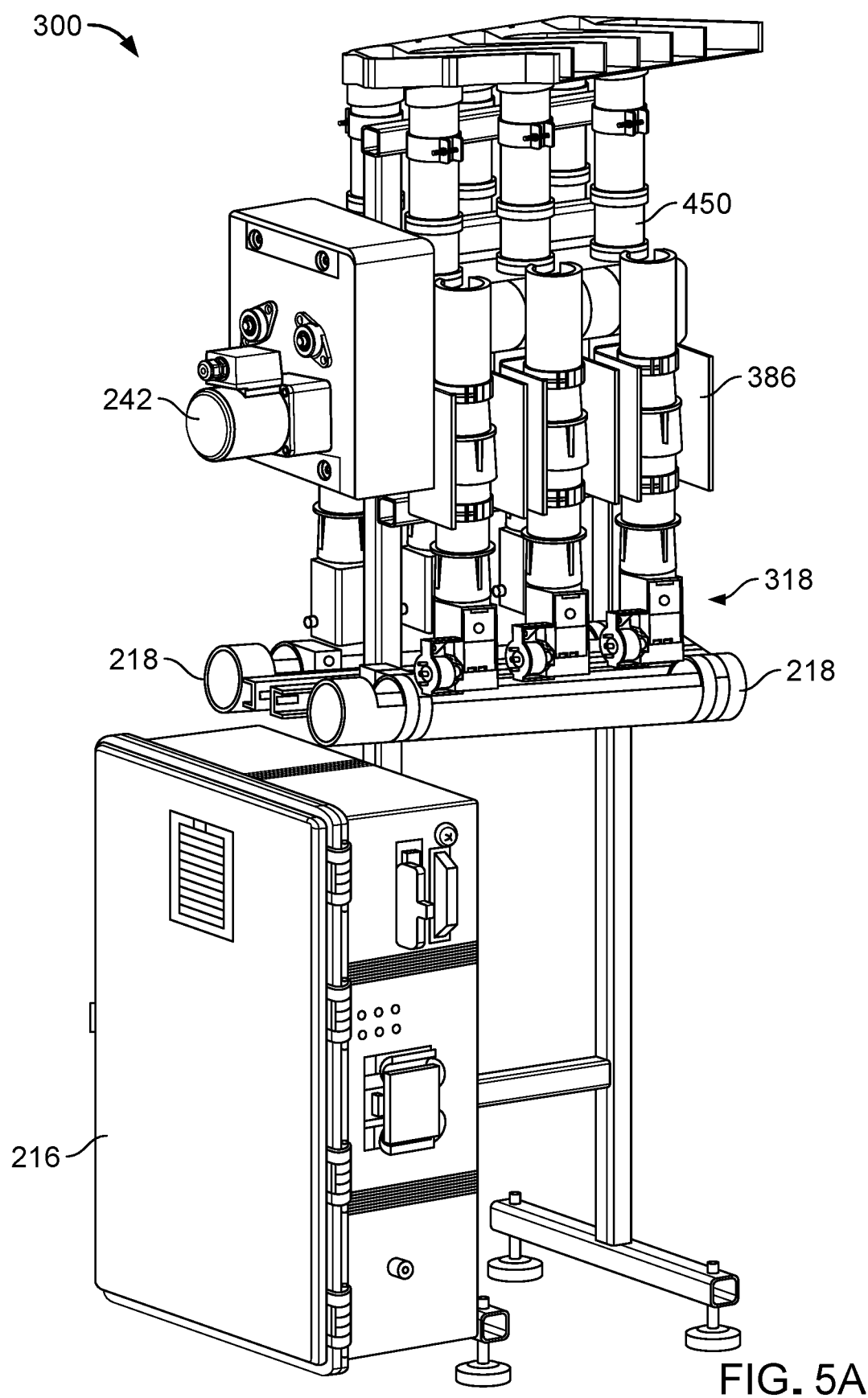
FIGS. 5A-5B are perspective views showing internal structures of another example of an RFID testing apparatus with a test lane adaptor therefor.
Figure 5B:
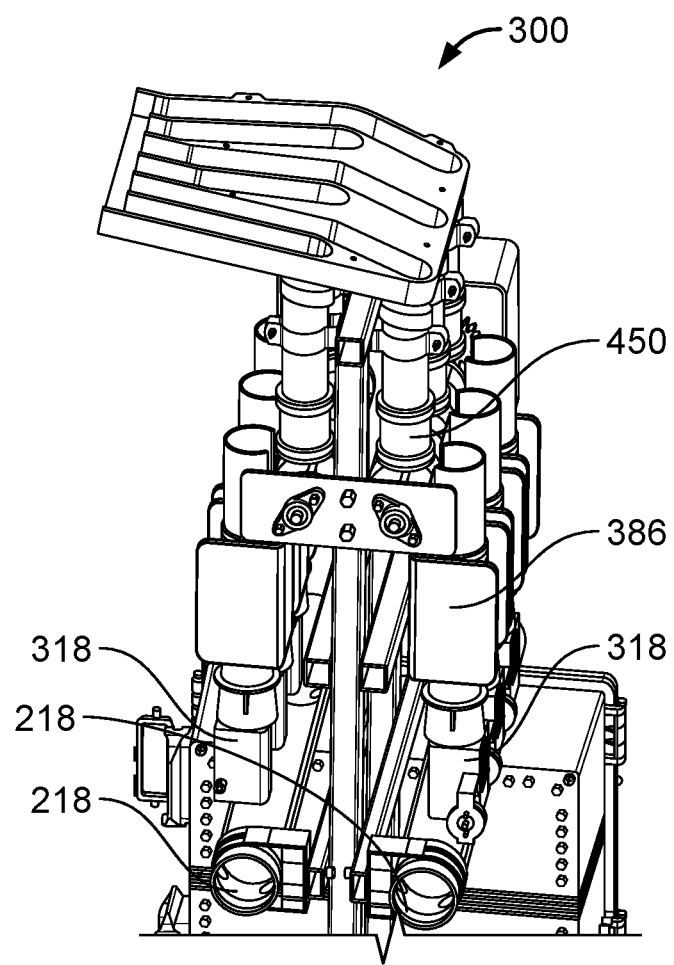

FIGS. 5A-5B are perspective views showing internal structures of another example of an RFID testing apparatus with a test lane adaptor therefor. FIG. 5A is a perspective view from a motor 242 side, and FIG. 5B is a cutaway perspective view from the opposite side. As shown, a test lane adaptor 300 is attached to six golf ball testing lanes, which each include a flexible end portion 450 (as described above in connection with FIGS. 4B and 4C) and a near-fielded and circularly polarized antenna with a metal shield 386 located around it (as described above in connection with FIGS. 3I and 3J). A controller 216 operates kickers 318 to kick out golf balls that should be removed from service, while letting golf balls that pass the RFID test drop into chutes 218 (as described above in connection with FIGS. 2A-2C and 3A-3D).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Thus, particular embodiments of the invention have been described. Other embodiments are also possible and may be claimed and/or be within the scope of the following claims. For example, the structures can be scaled up and reinforced to handle balls other than golf balls, such as baseballs, softballs, or bowling balls with embedded RFID tags. Different numbers of testing lanes can be employed, including a dozen or more, potentially up to a hundred using modular configuration. In some implementations, multi-position kickers/gates can be used to direct the flow of golf balls to two or more tracks/outputs based on RFID reading, rather than a binary decision per kicker.

What is claimed is:

1. An apparatus for testing golf balls including Radio Frequency Identification (RFID) tags, the apparatus comprising:
   one or more RFID readers having associated read zones for the golf balls;
   a star wheel unit defining cavities to receive the golf balls, the star wheel unit being positioned to drop the golf balls into respective paths through the read zones with alternating timing to reduce cross-talk, interference or both;
   golf ball sensors comprising at least one sensor for each respective path through the read zones;
   kickers comprising at least one kicker positioned after each respective path through the read zones and arranged to change a golf ball's direction of travel when the at least one kicker is activated; and
   a controller coupled with the kickers, the golf ball sensors, and the one or more RFID readers, wherein the controller is configured to activate any of the kickers responsive to the one or more RFID readers inadequately reading an RFID tag in a golf ball detected by the at least one sensor for an activated kicker's associated path through the activated kicker's read zone.

2. The apparatus of claim 1, wherein the one or more RFID readers comprise a single reader multiplexed among all the read zones for the golf balls.

3. The apparatus of claim 1, wherein the one or more RFID readers comprise a separate RFID reader for each of the read zones for the golf balls.

4. The apparatus of claim 1, wherein the one or more RFID readers comprise two or more separate RFID readers for two or more separate sets of golf ball testing lanes comprising the read zones for the golf balls.

5. The apparatus of claim 1, wherein the star wheel unit, the golf ball sensors, the read zones, and the kickers form a first set of golf ball testing lanes, and the apparatus comprises a second set of golf ball testing lanes comprising:
   a second star wheel unit defining second cavities to receive the golf balls, the second star wheel unit being positioned to drop the golf balls into respective paths through second read zones associated with the one or more RFID readers;
   second golf ball sensors comprising at least one sensor for each respective path through the second read zones; and
   second kickers comprising at least one kicker positioned after each respective path through the second read zones and arranged to change a golf ball's direction of travel when the at least one kicker is activated; and
   wherein the controller is coupled with the second kickers, the second golf ball sensors, and the one or more RFID readers, and the controller is configured to activate any of the second kickers responsive to the one or more RFID readers inadequately reading an RFID tag in a golf ball detected by the at least one sensor for an activated second kicker's associated path through the activated second kicker's read zone.

6. The apparatus of claim 5, wherein each of the star wheel units defines five cavities to receive the golf balls in respective ones of at least three golf ball testing lanes.

7. The apparatus of claim 6, wherein the five cavities in each adjacent golf ball testing lane of a given star wheel unit are offset from each other such that the golf balls do not pass through adjacent read zones at a same time.

8. The apparatus of claim 5, wherein each path through a read zone or a second read zone is formed by a housing that defines a helical track arranged to cause each of the golf balls to assume different orientations with respect to an antenna of the one or more RFID readers as each of the golf balls spirals down the helical track in response to gravitational force.

9. The apparatus of claim 8, wherein the antenna for each path through a read zone or a second read zone is a single near-fielded antenna with a right-hand circular polarization, the antenna being arranged with respect to the helical track to read a golf ball moving along the helical track, and the antenna being coupled with a housing made of an RF reflecting material with a ground side of the antenna facing the RF reflecting material.

10. The apparatus of claim 5, wherein each of the golf ball testing lanes comprises an additional kicker, and the controller is configured to activate any of the additional kickers responsive to the one or more RFID readers successfully reading an RFID tag in a golf ball detected by the at least one sensor for an activated additional kicker's associated path through the activated additional kicker's read zone when a program indicates the successfully read RFID tag is for a golf ball to be pulled from service.

11. The apparatus of claim 10, wherein the program indicates the golf ball to be pulled from service has been hit more than a threshold number of times and should be refurbished or refinished.

12. The apparatus of claim 5, comprising:
feed tubes for the first and second sets of golf ball testing lanes;
a test lane adaptor comprising a feed tray and a ball lane router; and
a ball supply device configured to drop the golf balls onto the feed tray;
wherein the feed tray is arranged to receive the golf balls and deliver the golf balls to the ball lane router in response to gravitational force acting on the golf balls; and
wherein the ball lane router is arranged to deliver the golf balls to respective ones of the feed tubes in response to gravitational force acting on the golf balls.

13. The apparatus of claim 12, wherein each of the feed tubes comprises a flexible end portion.

14. The apparatus of claim 13, comprising a golf ball sensor positioned where the feed tray meets the ball lane router, wherein the golf ball sensor triggers stops and starts of the ball supply device to prevent jamming.

15. The apparatus of claim 14, wherein the ball supply device comprises a ball conveyor comprising shelves arranged to hold multiple golf balls in a line on each of the shelves, and the apparatus comprises a wall portion for the ball conveyor, the wall portion comprising a panel that stops the multiple golf balls on a shelf as the multiple golf balls pass over a top of the ball conveyor, and the wall portion defining an opening that allows only a single line of golf balls on a single shelf to be dropped onto the feed tray at a time.

16. The apparatus of claim 12, wherein the feed tray comprises a ball lane sorter having side walls that define lanes arranged to receive the golf balls, the side walls of the ball lane sorter comprise two exterior walls that are taller than the golf balls, and two or more interior walls that are shorter than the golf balls.

17. The apparatus of claim 16, wherein the ball lane sorter includes perforations that allow water and any remaining debris from ball washing to pass through the perforations while also allowing the golf balls to roll freely in response to gravitational force acting on the golf balls.

18. The apparatus of claim 5, wherein each of the kickers or second kickers comprises a solenoid connected to a spring-loaded door that changes orientation to prevent a golf ball from passing through the kicker when the kicker is activated.

19. The apparatus of claim 5, wherein the apparatus is constructed from modular pieces that allow variations in a number of golf ball testing lanes.

20. A system comprising:
a golf range comprising targets for golf balls and one or more ball collection structures, wherein each of the golf balls includes a Radio Frequency Identification (RFID) tag, and each of the targets has at least one associated RFID reader; and
a golf ball testing apparatus arranged to receive the golf balls, the golf ball testing apparatus comprising
one or more RFID readers having associated read zones for the golf balls,
a star wheel unit defining cavities to receive the golf balls, the star wheel unit being positioned to drop the golf balls into respective paths through the read zones with alternating timing to reduce cross-talk, interference or both,
golf ball sensors comprising at least one sensor for each respective path through the read zones,
kickers comprising at least one kicker positioned after each respective path through the read zones and arranged to change a golf ball's direction of travel when the at least one kicker is activated, and
a controller coupled with the kickers, the golf ball sensors, and the one or more RFID readers, wherein the controller is configured to activate any of the kickers responsive to the one or more RFID readers inadequately reading an RFID tag in a golf ball detected by the at least one sensor for an activated kicker's associated path through the activated kicker's read zone.

21. The system of claim 20, wherein the star wheel unit comprises at least three star wheels corresponding to at least three golf ball testing lanes, and the golf ball testing apparatus comprises:
feed tubes for the golf ball testing lanes;
a test lane adaptor comprising a feed tray and a ball lane router; and
a ball supply device configured to drop the golf balls onto the feed tray;
wherein the feed tray is arranged to receive the golf balls and deliver the golf balls to the ball lane router in response to gravitational force acting on the golf balls; and
wherein the ball lane router is arranged to deliver the golf balls to respective ones of the feed tubes in response to gravitational force acting on the golf balls.

* * * * *